United States Patent [19]
Hansen et al.

[11] Patent Number: 5,934,704
[45] Date of Patent: Aug. 10, 1999

[54] VEHICLE STEERING COLUMN CONTROL SYSTEM

[75] Inventors: James E. Hansen, Oak Creek; Ruth E. Hubbell, Milwaukee; William J. Janutka, West Allis; B. Thomas Pier, Milwaukee; Scott A. Reid, Brookfield; Walter L. Rutchik, New Berlin, all of Wis.

[73] Assignee: Eaton Corporation, Cleveland, Ohio

[21] Appl. No.: 08/790,000

[22] Filed: Jan. 28, 1997

Related U.S. Application Data

[63] Continuation-in-part of application No. 08/233,658, Apr. 26, 1994, Pat. No. 5,636,863.

[51] Int. Cl.$^6$ .................................................. B60R 21/32
[52] U.S. Cl. ......................... 280/735; 280/731; 340/436
[58] Field of Search ................................. 280/735, 734, 280/731; 307/10.1; 439/15, 164; 340/428, 429, 436

[56] References Cited

U.S. PATENT DOCUMENTS

| | | | |
|---|---|---|---|
| 4,218,073 | 8/1980 | Cymbal | 439/15 |
| 4,422,699 | 12/1983 | Sakurai et al. | 439/164 |
| 4,608,550 | 8/1986 | Umebayashi et al. | 307/10.1 |
| 4,623,889 | 11/1986 | Tanaka et al. | 307/10.1 |
| 4,792,783 | 12/1988 | Burgess et al. | 307/10.1 |
| 5,078,422 | 1/1992 | Hamilton et al. | 280/741 |

FOREIGN PATENT DOCUMENTS

| | | | |
|---|---|---|---|
| 482234 A1 | 4/1992 | European Pat. Off. | 307/10.1 |
| 0520535 | 12/1992 | European Pat. Off. | |
| 543483 A1 | 5/1993 | European Pat. Off. | 307/10.1 |
| 0616924 | 9/1994 | European Pat. Off. | |
| 3520972 | 6/1986 | Germany | 307/10.1 |
| 3812631 | 4/1989 | Germany | |
| 3915188 | 11/1990 | Germany | |

*Primary Examiner*—Eric Culbreth
*Attorney, Agent, or Firm*—Fay, Sharpe, Beall, Fagan, Minnich & Mckee, LLP

[57] ABSTRACT

A control circuit is provided for transferring power and communication signals through a wireless coupling device in a vehicle steering column. The device can include a rotary transformer having a primary and secondary magnetic structure respectively associated with the wheel side and column side of the steering column. A squib power circuit transforms a high energy power signal suitable for firing an air bag from the column side to the wheel side. A low energy power circuit generates a signal from the column side to the wheel side suitable for operating isolated wheel side electronics, such as cruise control and the like. A tone encoder and decoder circuit communicates low level control signals suitable for signaling wheel side commands from the wheel side to the column side. The low energy power circuit and the tone encoder circuit operate simultaneously and continuously without signal debilitating interaction. An alternative embodiment avoids the low energy power circuit and the encoder and decoder circuit and includes a pulse circuit to impress a test signal on the wheel side to generate a ring signal representative of air bag firing operability and whether a horn switch is depressed.

12 Claims, 19 Drawing Sheets

VEHICLE STEERING COLUMN CONTROL SYSTEM

This application is a continuation-in-part application of U.S. Ser. No. 08/233,685, filed Apr. 26, 1994, now U.S. Pat. No. 5,636,863.

BACKGROUND OF THE INVENTION

This invention pertains to the art of vehicle control systems and more particularly to a control system capable of generating an air bag deployment signal upon a vehicle collision for an air bag stored in a steering wheel/column and for also transferring a biasing power signal to control circuitry in the wheel for communicating selected driver control signals from the wheel through the column to sensor processing control circuitry. The invention is especially applicable to a control system for transferring signals across a rotating interface. The system is intended to be capable of transferring both an air bag deployment signal and driving control (cruise, climate control, etc.) signals from the steering wheel to the steering column. However, it will be appreciated to those skilled in the art that the invention could be readily adapted for use in other environments as, for example, where a plurality of signals of varying frequency and amplitude need to be communicated through a physically moving part, and in particular a part that is continually rotating.

When vehicle air bags were initially introduced on the market, it was necessary to remove driver control functions from the steering wheel and install them on stalks that emanated from the steering column. Typically, the only two items which remained that were wheel-mounted were the air bag and the horn. The signal for the horn was transferred from the wheel to the column through slip rings. The slip rings consisted of a ball contact located on the steering wheel and a circular conductor which was part of a "clock spring". The clock spring was a molded plastic part which housed a two conductor ribbon cable that connected the air bag to its control module. Such a clock spring is capable of maintaining electrical connections during rotation of the wheel.

As the demand for placement of driver controls back onto the steering wheel has become greater, the clock spring was changed to comprise a housing for a multi-conductor ribbon cable and/or slip ring. This arrangement allowed both the air bag and driver control switches to operate independently on the steering wheel. Some clock springs have as many as six conductor ribbon cables and no slip rings.

The numerous design concepts comprising adaptations of slip rings and clock springs have been fraught with problems and are of limited economic and practical value. Slip ring arrangements have always suffered from reliability and performance problems due to the inherent nature of the slip ring structure itself. The electrical integrity of the contacting methods will necessarily depreciate over time from dirt and/or wear and varying ambient conditions. In addition, the assembly requirements for multi-conductor ribbon cables in a steering column have been notoriously undesirable for the vehicle manufacturers, not only for the relatively high expense of the cable and contact components themselves, but also from the labor costs involved in the assembly operation.

A particular problem with prior known systems which have placed certain driver controls back onto the steering wheel concerns the increased complexity in wheel side electronics. Problems with assembly, maintenance and reliability will always arise as the complexity of circuitry increases in an automobile component, such as a steering wheel.

The present invention contemplates a new and improved method and apparatus which overcomes the above-referred to problems to provide a new vehicle steering column control system which is relatively simple in design, economical to manufacture and assemble and provides high reliability and performance in deploying both an air bag ignition signal and communication of biasing power and driver control signals both to and from the steering wheel and the steering column.

BRIEF SUMMARY OF THE INVENTION

In accordance with the present invention, there is provided electronic control circuitry which accomplishes three major functions:

1. Provide a high power signal to a steering wheel rotary transformer sufficient to fire an air bag squib.
2. Provide driver communications (such as cruise control command signals) from the steering wheel back through the rotary transformer to the steering column, for various control purposes.
3. Supply continuous low-level operating power for isolated wheel side electronics that comprise the driver controlled communication devices, from the column side, through the transformer, to the wheel.

The system employs a rotary transformer that provides uniform coupling across a rotating interface regardless of the rotational angle between the primary and secondary magnetic structures. The transformer is of a sufficiently small size that it can be practically integrated into a steering wheel/column structure, yet is able to transfer the several amperes of current required to fire an air bag squib element.

The subject invention more particularly comprises a control circuit for transferring power and communications to a vehicle steering column comprising a rotary transformer having a primary and secondary magnetic structure, wherein the primary magnetic structure is associated with a column side of the steering column and the secondary side of the steering column is associated with the wheel side of the steering column. A first circuit portion transfers a high energy power signal suitable for firing an air bag from the column side to the wheel side. A second circuit portion transfers a low energy power signal from the column side to the wheel side suitable for operating isolated wheel side electronics. A third circuit portion communicates low-level control signals suitable for signaling wheel side commands from the wheel side to the column side, wherein the second and third circuits can simultaneously operate continuously without signal debilitating interaction. The high energy power signal transferred by the first circuit is of such energy that it will, of course, overwhelm the other signals, but in the condition of a collision, wherein the air bag is enabled, wheel side control signals will be irrelevant.

In accordance with another aspect of the present invention, the first circuit portion includes a fire switch associated with the column side which is enabled during the vehicle collision and a squib switch associated with the wheel side for connecting the high power signal to a squib element in a firing condition for the air bag. The squib switch includes a means for isolating the squib element from the low energy power signal and the low level control signals in normal operating conditions to preclude shunting of other functions thereof by the squib element.

In accordance with a further aspect of the present invention, the high energy power portion signal is tuned to a frequency detectably spaced from a frequency of the low energy power signal and the high energy power signal has a voltage level detectably spaced from a voltage level of the low level control signals. A filter segregates the low energy power signal and the low level control signals from the squib element. The filter comprises a frequency band filter for attenuating the low energy power signal and a level detection circuit for excluding the low level control signals.

In accordance with a more limited aspect of the present invention, the first circuit portion includes a squib power circuit associated with the power switch for generating the high power signal. The squib power circuit includes a test circuit for testing if the squib element is present and capable of receiving the high power signal at vehicle start up. Power up is detected from the control circuit and a pulse is supplied to the squib element of the high power signal at a selectively reduced power level selected to be below the ignition point of the squib, for exercising and demonstrating the full function of the circuit.

An alternative embodiment of the present invention contemplates a method and apparatus which can produce a high energy signal communicated through a contactless device like a rotary transformer that is suitable to deploy the airbag, and which further includes a test circuit for applying a test pulse across the transformer device and sensing a second signal in response to the pulse, which signal is selectively representative of the operability of the airbag firing signal circuit. Further, a horn switch circuit is operable in combination with the test pulse signal, so that activation of the horn switch alters the responsive signal of the pulse in a manner which is also identifiable by a column side electronic circuit in order to actually activate the horn. This alternative test circuit and signal consumes a relatively low level of power and so can be continually operable for monitoring airbag operability and horn activation, even when running on mere battery power.

One benefit obtained by the present invention is an air bag control system which allows a transfer of control and power signals across a rotating interface with structural simplicity and high reliability. Previous structural requirements of multi-ribbon cable and slip ring conductors are avoided.

Another benefit obtained from the present invention is an air bag firing control system which is economically more efficient in assembly and structural cost.

A further benefit of the present invention is a steering column control circuit which employs signal control circuitry (DTMF) with proven performance achievements for enhanced reliability and performance, in combination with a signal transferring rotary transformer which provided a non-contacting signal transferring method.

A benefit of an alternative embodiment of the invention incorporating minimal wheel side electronics, e.g., a horn, allows for monitoring of airbag operability and horn activation by mere detection of response of transformer secondary side "ringing" in response to imposition of a test pulse from the primary side. Such a system allows for continual monitoring of the airbag and the horn, even by mere battery power, as when the vehicle is shut off. Accordingly, the subject invention provides substantial benefit and safety by continually monitoring the airbag firing system.

Other benefits and advantages for the subject new control system will become apparent to those skilled in the art upon a reading and understanding of this specification.

BRIEF DESCRIPTION OF THE DRAWINGS

The invention may take physical form in certain elements and arrangements of elements the preferred and alternative embodiments of which will be described in detail in this specification and illustrated in the accompanying drawings which form a part hereof and wherein.

DETAILED DESCRIPTION OF THE INVENTION

Figure 1:
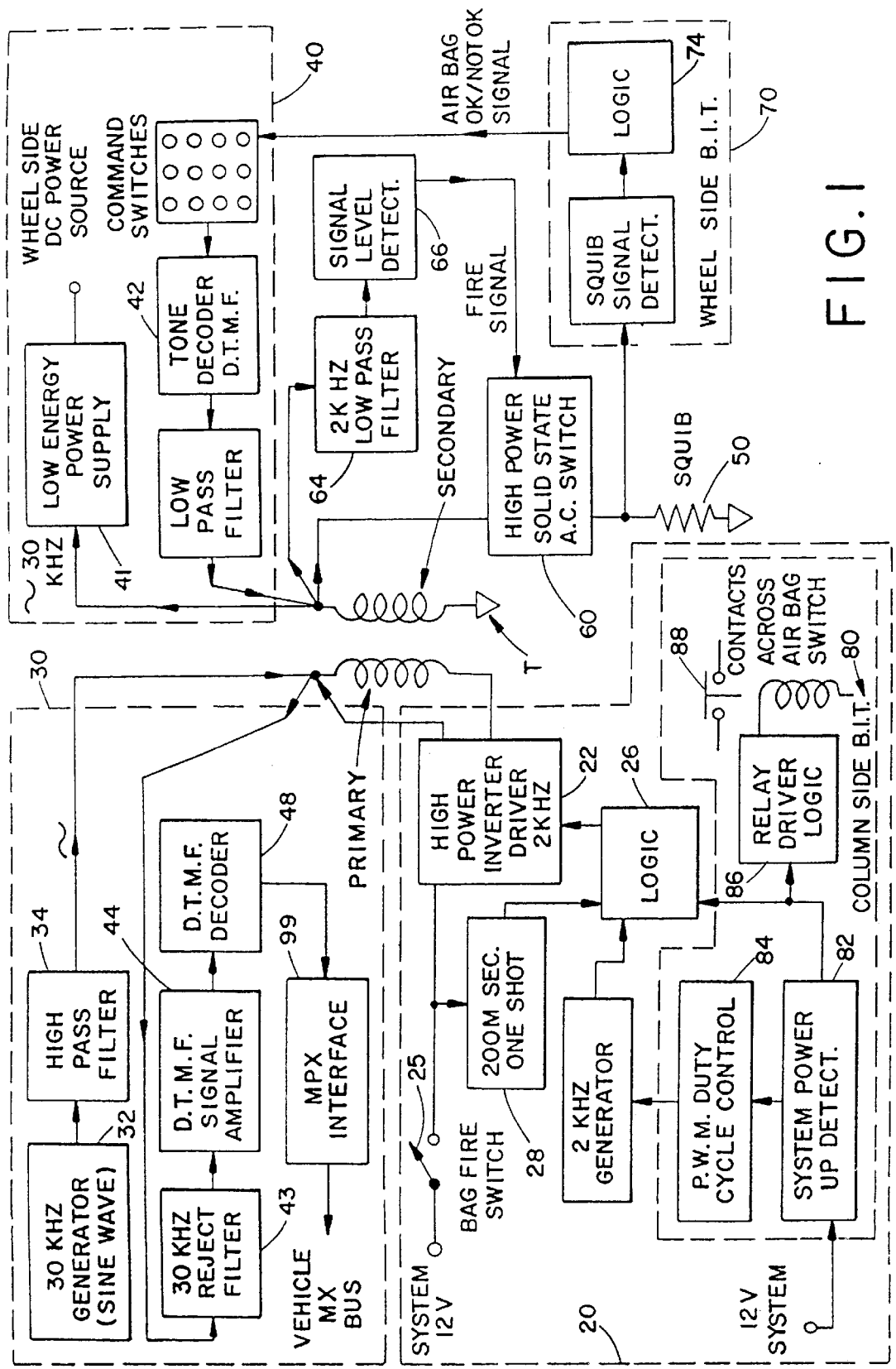
FIG. 1 is a block diagram of a steering wheel control system formed in accordance with the present invention.

Referring now to the drawings wherein the showings are for purposes of illustrating the preferred and alternative embodiments of the invention only, and not for purposes of limiting same, the FIGURES show a control circuit particularly intended for use in a steering column of a motor vehicle (not shown). The control circuit transfers power and communication signals through a steering column comprised of a selectively rotatable wheel and a fixed steering column. The circuit is basically comprised of a common signal coupling device for contemporaneous parallel transmission of the signals through the vehicle steering column, preferably shown as a rotary transformer T having a primary and secondary magnetic structure, wherein the primary magnetic structure is associated with the column side (FIGS. 2A and 2C) of the steering column and the secondary magnetic structure is associated with the wheel side of the steering column (FIGS. 2B and 2D). A first circuit portion 20 (FIG. 2C, shown in dashed line), transfers a high energy power signal suitable for firing an air bag (not shown) from the column side to the wheel side. A second circuit portion 30 (FIG. 2A) transfers a low energy power signal from the column side to the wheel side suitable for operating isolated wheel side electronics and decodes driver generated control signals. A third circuit portion 40 (FIG. 2D) communicates low level control signals suitable for signaling wheel side commands (cruise, climate control and the like) from the wheel side to the column side. It is a feature of the invention that the second and third circuit portions can simultaneously operate through the transformer T regardless of rotational position of the wheel relative to the column and continuously without signal debilitating interaction. The output circuit portion 20 generates a relatively high power signal to ignite a squib 50 for deploying an air bag to protect the driver of the vehicle in a collision. Other elements represented in the block diagram of FIG. 1 comprise the high power solid state switch 60 which fires the squib 50 and a test circuit 70 which tests the operability of the squib firing circuit without actually firing the squib, such as at vehicle start up.

Figure 2A:
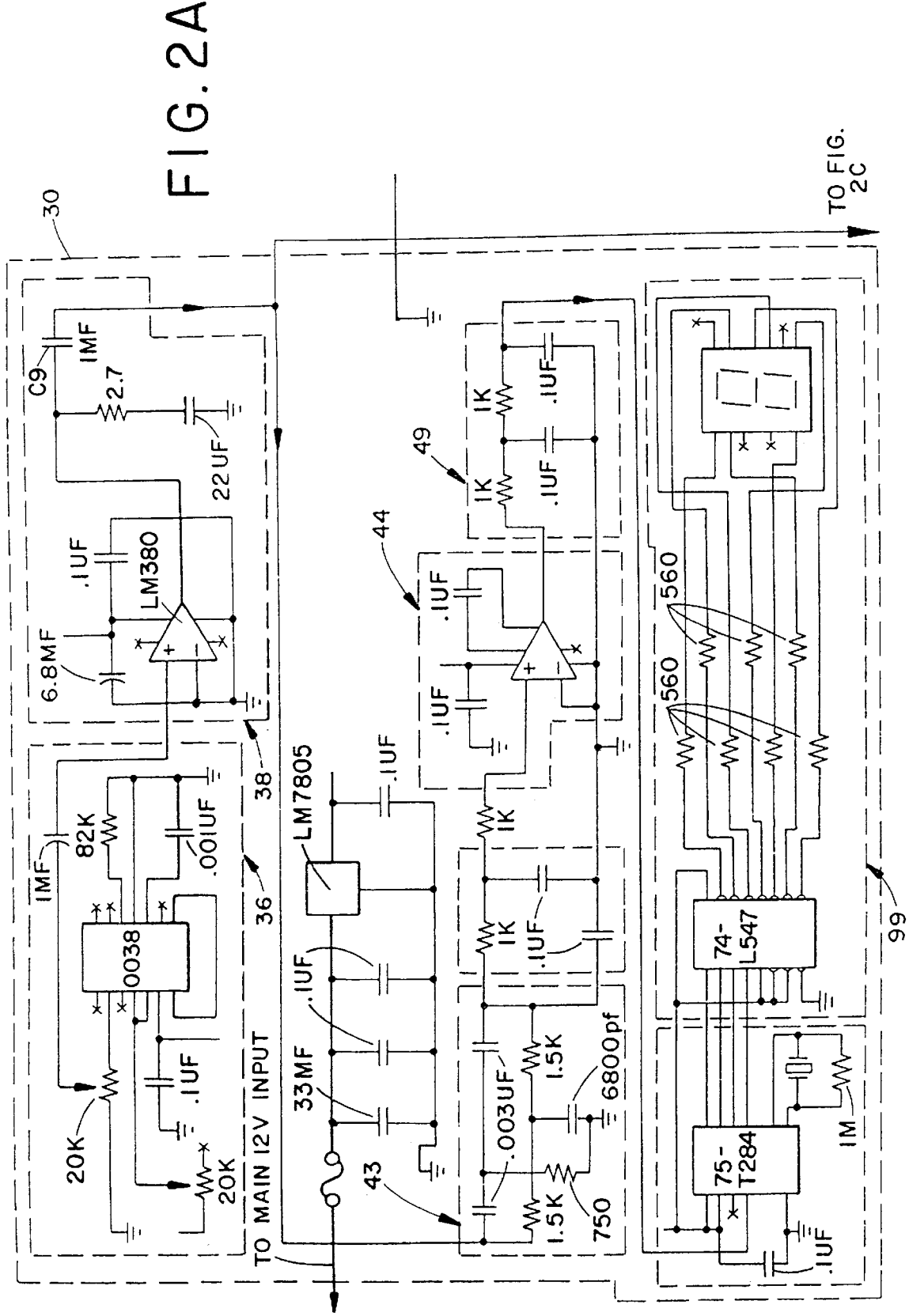
FIGS. 2A–2D comprise a detailed schematic of a circuit of the present invention.

During normal operation of the circuit (non-air bag firing operation), only communication functions are required through the steering column from control switches on the wheel side back through the transformer T to the column side. Although to accomplish these communication functions, power must be transferred for the wheel side electronics continuously from the column side. A thirty Khz generator 32 generates a sine wave shaped power signal. A sine wave shape is used to minimize EMI interference to the vehicle system. A high pass filter 34 amplifies the signal to a level of several volts into the primary of the rotary transformer T. With particular reference to FIG. 2A, the detailed schematic of this portion of the circuit is illustrated wherein a function generator integrated circuit 36 (such as an ICL 8038) generates the sine wave shaped signal, which is then amplified by a power amplifier integrated circuit 38 (LM 380) to the level of several volts into the transformer primary.

This power signal is coupled to the secondary winding of the transformer T as a low energy power signal for tone encoder circuit 40. In particular, the signal is fed through a current limiting resistor 45 (FIG. 2D) and a rectifier diode (1N 4934) 46 into a one micro farad capacitor 47. The DC voltage formed across the capacitor is the low power DC voltage source (VCC)(FIG. 1) for the wheel side electronics. The high, 30 khz frequency assures that the primary winding reactance will be high enough to keep primary current to a relatively low level, since only low power transfer is necessary for normal signal communication operation. Also, the 30 khz signal can then be filtered or separated more easily from the low level communication signals which occur between 697 and 1645 hz and the high power air bag firing signal which is set at 2 khz. Although the preferred embodiment discloses the lower power signal to be 30 khz, of course, other frequencies can be used so long as they are capable of being separated from the other frequencies with the appropriate filters.

Communication signals for the wheel side switch commands are accomplished with a standard telephone keypad encoder integrated circuit 42. This dualtone/multi frequency encoder (D.T.M.F.) merely converts switch closure commands into tone signals ranging from 697 hz to 1,645 hz which are then coupled back through the rotary transformer secondary back to the column side primary winding where tones are extracted, amplified and decoded for control purposes. These are important operational features of the subject invention since the tone signals are of a very low level of only a few millivolts in the presence of several volts for the 30 khz low energy supply signal. This operational advantage is accomplished as follows. First, the signal 43 at the transformer primary is fed to a "Twin T" notch filter tuned to 30 khz which provides significant attenuation of the 30 khz signal, yet allows the communications tone signals to pass virtually unattenuated. The filter output is then fed to an additional RC filter. The 30 khz signal has now been reduced below the level of the tone signals. Although the tone signals are still at a very low level, at this point, they are amplified by an amplifier 44 (LM 386) for voltage amplification to a usable level. The output of the amplifier 44 is then fed to a two-stage RC filter 49 for additional filtering of any 30 khz components which may have coupled through. The now "clean" amplified tone signals are fed to a DTMF decoder 48 (75T204) and are converted to logic signals. The logic signals are fed to a multiplexer interface 99 and then to the appropriate digital signal processing circuitry through the vehicle MX bus. Both the DTMF encoder 42 and decoder 48 are crystal controlled for extreme stability under all conditions and require no tuning or adjustments. Such components enjoy wide proliferation for telephone based applications, and are accordingly inexpensive and reliable.

Although the system has been described as using DTMF encoders and decoders, other communication schemes are within the scope of the invention and have been considered and evaluated with success, so long as proper filtering is accomplished for isolation of the power supply signal frequencies. Such other methods involve modulating the tone frequencies onto the power supply signal using it as a "carrier frequency" (rather than linearly mixing them), or using frequency shift keying (FSK) techniques. Such other alternative techniques have successfully demonstrated bidirectional communication.

Air Bag Firing Condition

An air bag firing condition is evoked if a collision occurs. Then a switched command signal, i.e., bag switch 25, applies power to a high power inverter circuit 22. A square wave signal of approximately 2 khz is imposed onto the transformer primary winding through a high current "H-drive" circuit 22. At this frequency the transformer T is capable of coupling large amounts of power. If a low impedance load, such as the air bag squib 50, is coupled across the transformer secondary, the reflected low impedance on the primary will produce very high primary (and secondary) currents to flow, but only if an adequate power driver circuit is used.

The H-drive alternately switches the primary with forward and reverse polarity square wave signals equal to the system DC power applied to it. With a conventional 12 volt vehicle system, this is the equivalent of applying a plus and minus 12 volt square wave (24 volts peak-to-peak) onto the transformer T, yet only using a single ended 12 volt supply. Accordingly, primary currents will exceed 20 amperes and secondary voltages and resultant currents into the squib are sufficient to fire an air bag.

In the embodiment shown in FIG. 2C, the square wave signal is initially generated by a 2 khz generator circuit 24 (TL 494 integrated circuit), especially designed for inverter and PWM power supply applications. Two alternating square wave signal outputs are generated (pins 9 and 10) to be used to drive the H-drive circuit 22. The H-drive output is comprised of four high current field-effect transistor (FET) power transistors 91, 92, 93, 94, two P-channel types and two N-channel types. For operation, for instance, transistors 91 and 94 are to be turned on to conduct current through the transformer primary in one direction. In effect, one side of the winding is connected to plus 12 volts and the other side to ground. On the next half-cycle, this is reversed by turning off transistors 91, 94 and instead turning on transistors 92, 93, and in effect reversing the polarity on the transformer. The generator circuit 24 is operated in a mode that allows a brief "OFF" period between polarity reversals to assure that two FETs on one side of the bridge are not simultaneously turned on, which could cause a short across the main supply to ground (i.e., transistors 91 and 93 are never on simultaneously, or transistors 92, 94 either). Logic circuity 26 between the generator 24 and the H-drive 22 is used to switch the H-drive 22 from a not operational state (normal system operation) to a fire condition. In other words, during normal operation of the steering control system, the H-drive 22 should not be operating in the high power inverter mode. Rather, a transistor 94 is the only FET biased on, and this is done to ground at one end of the transformer primary, which is necessary for normal operation. The other three FETS 91, 92, 93 are held in an OFF state by the logic circuitry, leaving the input side of the transformer primary effectively open for the normal communications low power supply signals to operate unhindered.

Another feature shown in the detailed schematic of the subject control system is that the reverse, source to drain substrate diode built into the FET 92 tends to clamp the input signals when they swing negative with respect to ground. This is circumvented in the circuitry shown by using a transorb D22 (high power zener diode 1N6283) in the source to ground connection of FET 92. The zener diode prevents reverse current flow from ground up to the source (and substrate diode) of FET 92 during the reverse polarity phase of the input signal (the 30 khz signal) to the transformer primary. When the H-drive 22 is in its high power inverter mode, the diode is essentially "transparent" to the circuit except for its forward bias voltage drop of approximately 0.6 volts. Because the current flow is high in the fire mode, the diode must be capable of handling this current and this is why a large zener (transorb) is used. In order to decrease the diode voltage drop in the forward direction, a "Schottky" diode D21 is shown in parallel with the zener. This can help reduce the forward voltage drop further, down to 0.2 to 0.3 volts. In the embodiment illustrated, five smaller Schottky diodes (1N5817) were used, but a single larger device would be appropriate.

A further feature of the subject inventive circuit is the use of a "one-shot" or monostable circuit 28, comprised of an integrated circuit (4538). When a fire sequence occurs, the logic steers the H-drive 22 into its high power inverter mode, the one-shot circuit 28 is triggered and causes this to occur for only a short period (200 ms), even though the fire input command from the switch 25 may stay on for an extended time. This is because only a brief period is required to fire the squib 50. This one-shot feature has the advantage of protecting the transformer from being driven for an extended period of time, which could overheat its windings.

Squib Firing Switch

On the secondary side of the transformer, under normal conditions the squib element must be isolated from it or its low resistance will shunt out the low power supply and tone communications signals. Yet, when a firing mode is to occur, the squib must be switched across the secondary by use of a low resistance, high current switch. This is accomplished by the circuit shown under "2 khz Squib Switch" 62 (FIG. 2B). Here, a solid state, high current AC 62 switch is used to isolate the squib from the transformer secondary under normal operating conditions. Two, back-to-back, N-channel power FETS, 96 and 97, are configured to act as an AC switch. In one direction of the AC line, one of the FETs will have positive polarity across its drain to source connections, and the other FET will be reversed. The forward biased one will carry current in the normal direction from drain to source (when its gate to source is biased on), and the reverse FET will carry this current through its integral reverse source to drain substrate diode, even though it is not operating as a normal transistor in this mode. When the line polarity is on the other ½ cycle of the AC line, the roles of each FET will be reversed. Whenever a DC gate voltage is applied to the two FETs from the common source connections to the common gate connections, the AC switch will be on, and when the gate signal is removed, they will both be off, blocking current conduction in both directions. With the present circuit, the AC switch is connected to the high side of the squib load, which means that when the FETs are in an "on" condition they will "float" above the ground level along with the incoming power signal from the transformer secondary. Thus, to assure that the FET 96 gate is biased to at least 5 volts above the common source connections (to assure that FET 96 is held on), the bias signal with respect to ground must exceed the highest positive polarity voltage level of the AC signal by at least 5 volts. To derive this, a voltage booster circuit is used. A small transformer X2, is connected across the rotary transformer secondary to provide an additional power source through diode D7 and capacitor C35, current limiting resistor R61 and zener diode D8. Alternatively an additional secondary winding (of smaller gauge wire) could be incorporated into the rotary transformer to provide the step-up. The negative end of this isolated supply is then connected to the positive side of the normal wheel side power supply (Vcc), to provide the boosted voltage which is then supplied to the emitter of PNP transistor Q13. Whenever this transistor is turned on, it will tie the boosted voltage to the FET transistor gates through limiting resistor R51, turning on the FETs. Zener diode D10 prevents the gate to source voltage from ever exceeding 16 vdc, however, protecting the gate circuits from excessive voltage, particularly when the power AC signal polarity is in the reverse direction. The base of Q13 is, in turn, driven by the collector circuit of NPN transistor Q12 through resistor R55. Q12 is toggled on and off by the logic output of the level detector/comparator stage of U14b as part of the level detection 66. This is accomplished as follows: First, the 2 Khz firing signal on the secondary of the rotary transformer must be distinguished from the 30 Khz power supply signal, both of which have appreciable voltage level swings, but differ significantly in frequency. Secondly, the 2 Khz signal must be distinguished from the communications tone signals which are very close in frequency, but much lower in amplitude. The prototype circuitry accomplishes this by using a sharp, frequency selective "low-pass" 64 filter to attenuate the 30 Khz signal to a very low level, essentially rejecting it, yet allows the lower, 2 Khz firing signal frequency to pass through unattenuated. The low pass filter 64, shown in FIG. 1 also, is a 2-pole, active filter comprised of operational amplifiers U14a and associated components. Although the 30 Khz signal has now been practically eliminated, the communications DTMF tone signals have not, and under normal operating conditions, these will pass through the filter. Because these tone signals are very low in amplitude they can be excluded with a level detection circuit 66 after the filter 64. This is accomplished by rectifying the output of the filter with diode D9, and smoothing it with capacitor C39, then feeding this to a voltage comparator circuit comprised of U14b, and reference divider R47, VR3 and R48. The divider sets up a DC voltage level that the filter output AC peaks must exceed before U14b will provide a logic signal for firing. Only the 2 Khz squib fire signal has both the low frequency and high amplitude level to pass through the filter, then be rectified to a DC level (by the 1N4148 diode D9 and the 0.1 mfd C39) to produce a DC voltage adequate to toggle the comparator which is then used to drive the gate circuit of the output AC switch, thus connecting the squib to the transformer. Note that the filter/threshold detector circuit normally operates at a very low power level, with U14 being a "micropower" type IC, assuring minimal loading on the low power 30 Khz power supply link. Whenever a high power 2 khz squib firing burst comes across the transformer, the available power supply is now dramatically stiffened and the switch control circuit can be allowed to draw more operating current to turn on, this occurring when Q12 and Q13 are turned on to drive the FET gates (i.e., the squib firing switch circuit normally idles at very low current levels until a firing sequence occurs, at which time it draws more current to bias on the FETs, although this is nothing compared to the current then being switched to the squib).

Built-in Test

With most air bag systems, a test function is invoked at vehicle start up. With such a test function, the plan is to detect power up and briefly pulse the squib firing sequence by enabling the 2 khz power inverter 22, but at a power level below the ignition point of the squib, while checking that the squib 50 is receiving the inverter signal. The subject invention accomplishes this task by reducing the duty cycle of the inverter signal. Segments of the square wave having nearly 50% duty cycle on the positive polarity poles and 50% on the negative poles, the pulses are only on for approximately 5–10% of the normal ON time. This is accomplished with the wheel side built in test circuit 70 and the column side built in test circuit 80. The column side built in test circuit includes a system power up detect circuit 82, a PWM duty cycle control 84 and a relay driver logic circuit 86 which operates the relay for controlling the contacts across the air bag switch 88. With particular reference to FIG. 2C, the column side built in test circuit is accomplished with the TL494 generator chip 24, because it is designed for pulse width modulation control. For instance, by varying DC voltage level on pin 3, the output duty cycle can be varied from virtually 0 to 100%.

Thus, for the power up test, the total squib firing circuitry comprising transformer T, squib firing circuit 20 and squib switch 60 can be tested without applying enough heating duty cycle to the squib 50 to fire it. This reduced duty cycle pulse train can be detected across the built in test circuit 70 comprising sample and hold type circuit 72, then fed as a logic signal from logic circuitry 74 to the tone encoder circuit 40, and then transmitted as a tone signal back to the column side decoder 48 as an "OK" signal for the bag test function immediately after the power pulse train terminates. Such a test scheme provides much more confidence in the total air bag firing system than a simple test that merely looks at the resistance of the squib 50 to see if it is present.

As noted above, the subject system was faced with the particular problem of integrating all circuit functions for successful continuous operation together without interaction or damage. The synergistic operation of the subject inventive circuitry provides an air bag control and firing circuit with substantial advantages over prior art systems.

Some further comments which will be appreciated by those of ordinary skill in the art with regard to the detailed schematic shown in FIGS. 2A–2D comprise:

As can be appreciated by reference to FIG. 2D, the 10 ohm current limiting resistor R57 and the 1N4739 zener diode D14 voltage clamp in the wheel side power supply circuit are mainly for protection when the 2 khz power inverter signal is present.

In FIG. 2A, the capacitor C9 between the output of the 30 khz driver circuit and the transformer primary cannot be too large, or its reactance, in conjunction with the low output impedance of the LM380 will shunt (attenuate) the tone frequencies coming back from the wheel side. Also, the 2 khz inverter signal would be shunted through this branch if the cap were large. Ideally, a more effective "high pass" filter should be used in this spot.

Extracting the low level tone signals in the presence of the high level 30 khz signal takes quite a bit of filtering, as described previously.

Figure 2B:
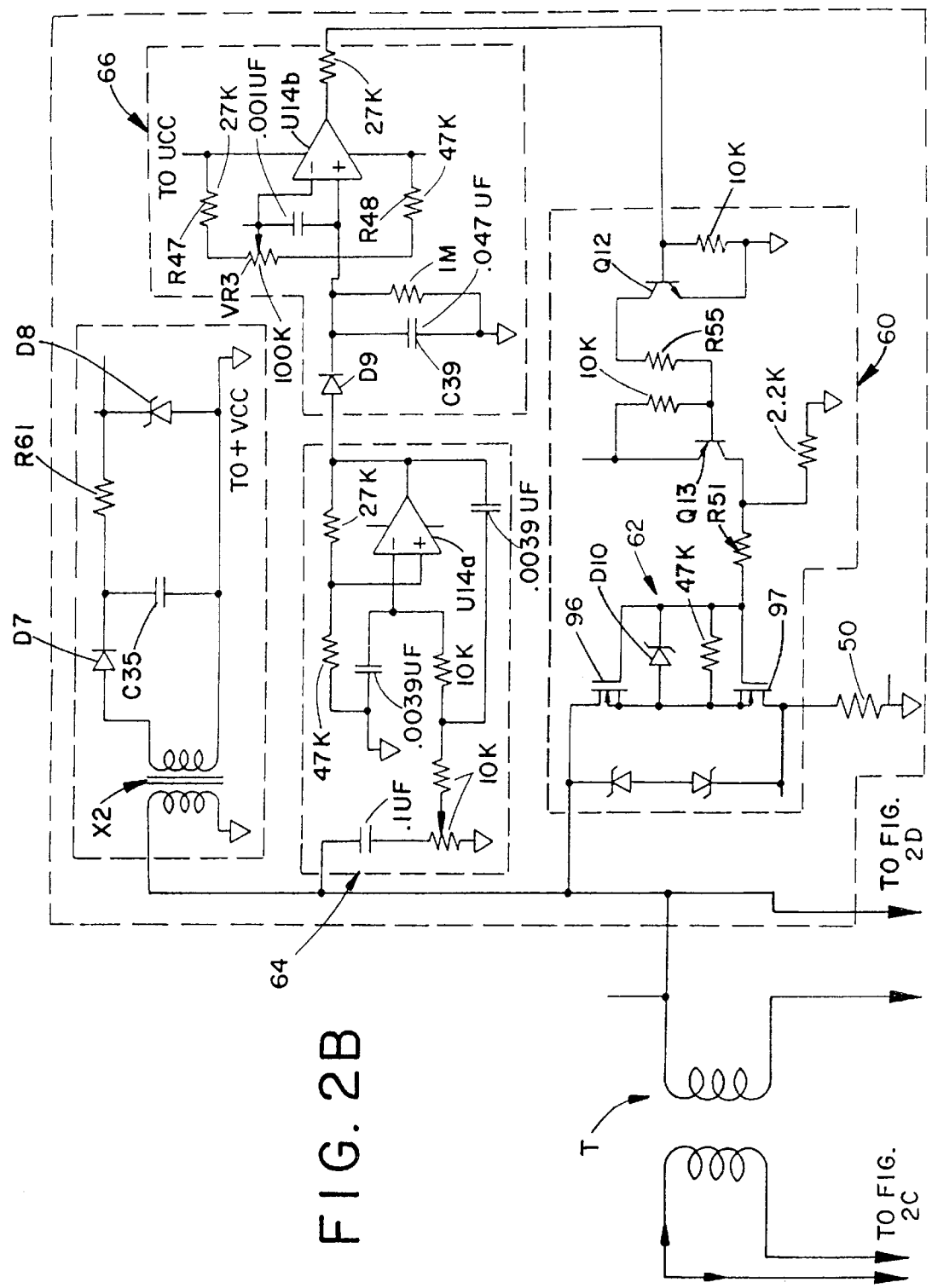
Figure 2C:
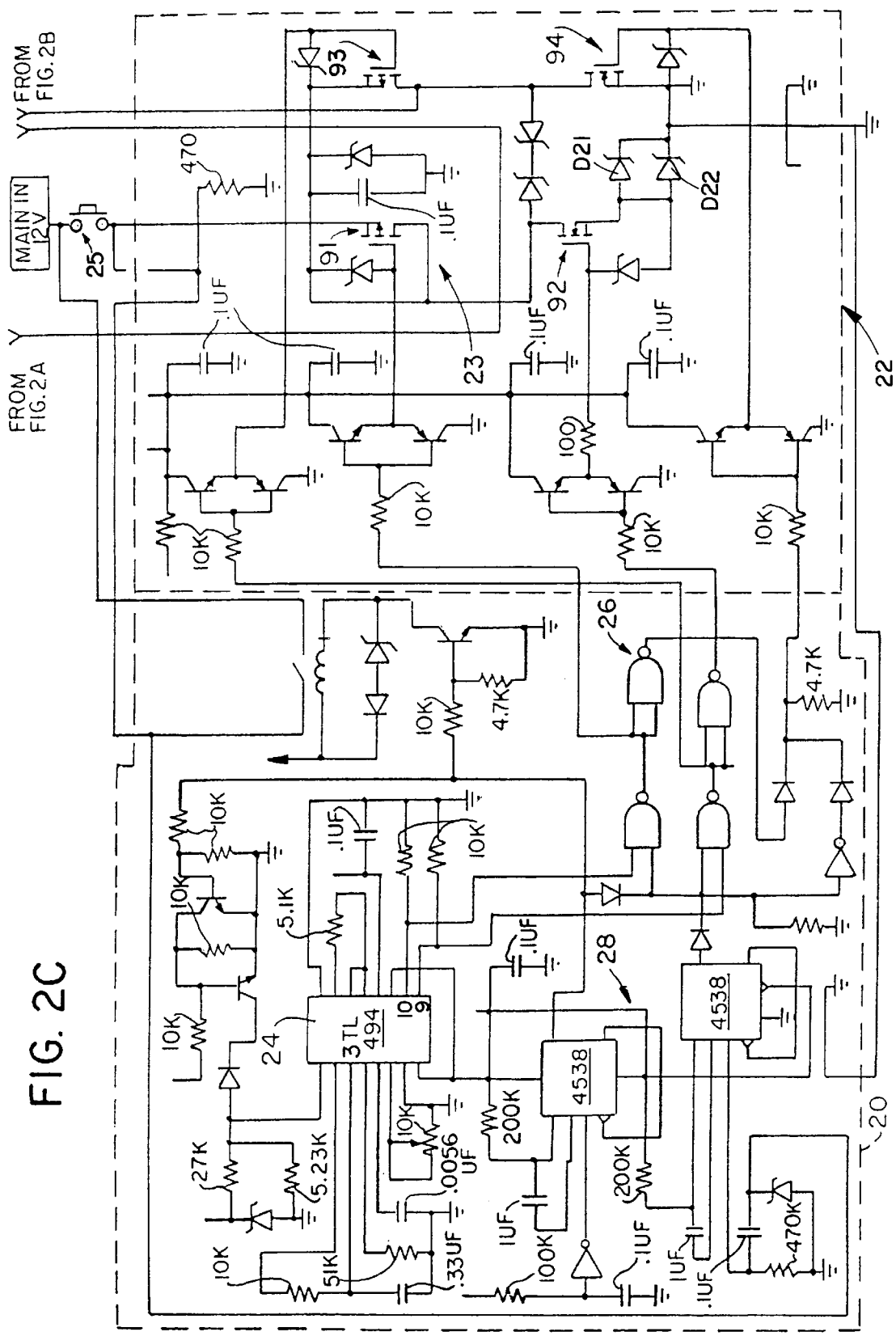
Figure 2D:
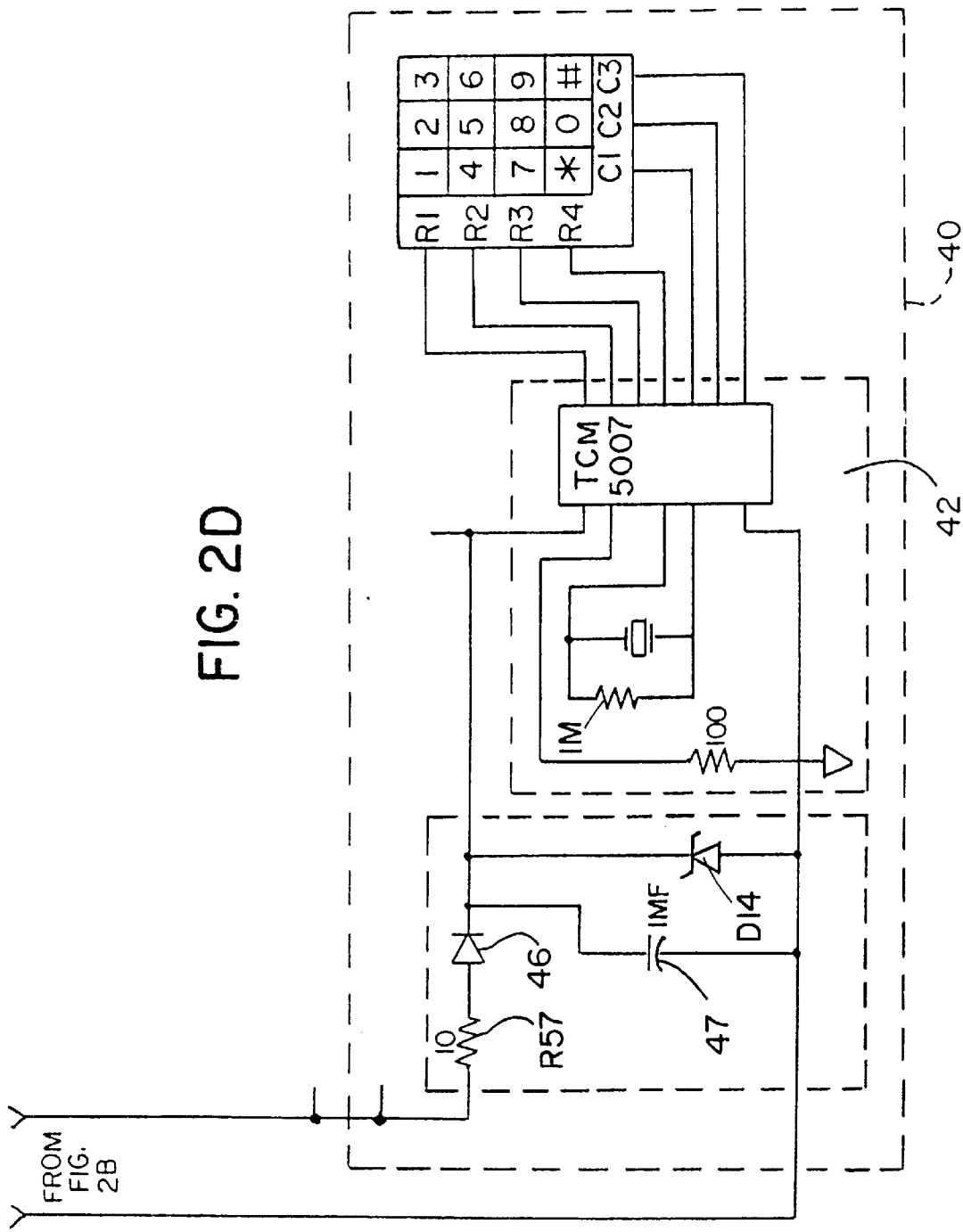
Figure 3:
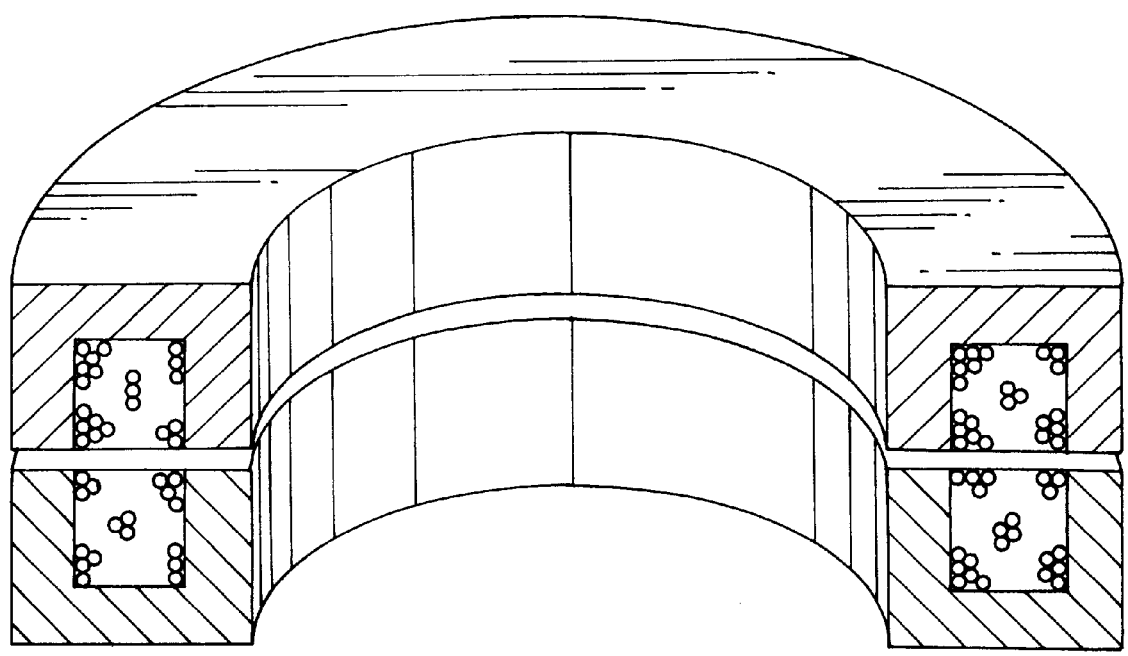
FIG. 3 comprises a schematic representation of a rotary transformer including concentric coils that can be utilized as part of the present invention.

Getting the H-drive circuit 22 (As seen in FIG. 1 and FIG. 2C) to work in two or three modes, and not affect normal operation was a challenge without using a relay contactor for the switching, which would have presented timing problems as well as cost and reliability.

The transformer T had to primarily be designed to efficiently transfer squib firing power from the column to the steering wheel. It was optimized to do this at about 2 khz. The other functions and circuit had to be tailored to work with this transformer. A primary to secondary turns ratio and wire sizes which were ideal for high power transfer were not ideal for the low power transfer and communications functions.

Although the continuous running, low energy power supply signal was transferred with a sine wave shape to minimize EMI generation, the high power firing signal was generated as a square wave signal for efficiency. Any brief EMI noise burst during an air bag firing scenario would not be of concern. The active filter use in the squib firing switch could also be accomplished in other ways, but whatever filter is used, it must be capable of processing several simultaneous signals at widely different amplitude levels. Some digital filters work well with single component signals, but cannot handle combinations. Analog filtering, as used, works well. This also applies to the filtering used on the input of the DTMF tone decoder circuitry.

The H-drive circuit 22 was required as maximum power was to be coupled to a single winding. If a center-tapped, dual 12 volt winding could have been used, the driver could have been a simple, two transistor "push-pull" output. Winding space considerations in the prototype transformer would not allow this, so forward and reverse drive of a single winding became necessary, hence the H-drive configuration.

Figure 4:
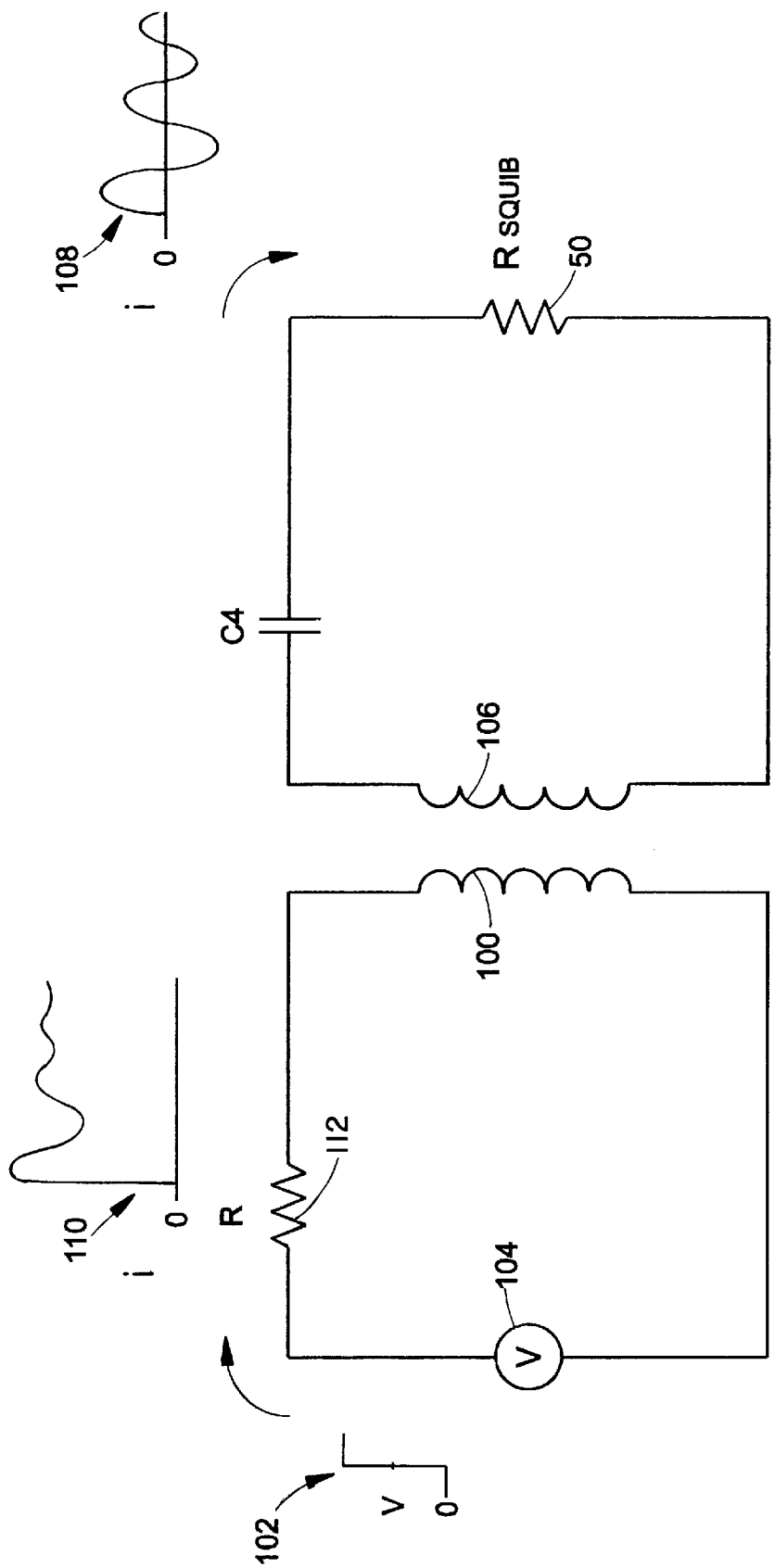
FIG. 4 comprises a simplified schematic for identifying the operating principles of an alternative embodiment.

With references to FIG. 4, an alternative embodiment of the subject invention is disclosed particularly directed to minimizing wheel side electronics so that only passive components are utilized on the wheel side. In other words, the second and third circuits for communicating a low energy power signal or low level control signals from wheel side to column side through the transformer T are not necessary. This alternative embodiment is directed to merely monitoring on the primary side of the transformer a reflected signal from the secondary side for purposes of identifying the operability of the airbag squib circuit on the secondary side, and whether a horn switch has been actuated on the secondary side. Accordingly, a contactless electrical link between the steering column and the steering wheel provides for signal diagnosis of the operability of the airbag firing circuit back to the column, as well as deployment thereof, and further includes a circuit for sounding of the horn in response to closure of a horn switch on the wheel side circuitry. All of these objectives are accomplished with only passive electrical components on the secondary side of the rotary transformer. Thus, the subject alternative embodiment is directed to the implementation of the rotary transformer as a contactless link between the wheel and column in a system providing essential system requirements (the horn and airbag testing), while incorporating only a minimum of task requirements on the wheel side.

The subject alternative embodiment involves the method of briefly pulsing the transformer primary winding and observing a subsequent "ringing" signature to derive information about conditions in the secondary winding on the isolated steering wheel.

In certain preexisting systems, resistance of the loop through the clock spring and squib was monitored with a low level DC current to ensure that the airbag could be fired when necessary. Since the rotary transformer T of the subject invention does not provide this direct electrical connection, the sensing process for monitoring secondary side conditions becomes more difficult.

The subject invention desirably concentrates most of the necessary circuitry on the column side for thereby minimizing wheel side circuit complexity. The invention further includes the transformer itself as a part of the monitoring process. The monitoring is accomplished at a low power level which minimizes the chances of unintended squib 50 ignition, electrical system loading and generation of electromagnetic interference. In the subject disclosed embodiment, in addition to determining squib operability conditions, the invention provides the ability to detect closure of a horn switch, which is also located on the steering wheel. Horn switch detection is accomplished regardless of the status of the squib condition on the secondary of the transformer, whether it is shorted, normal, or open.

Further, with this technique, operating power can be low enough to provide horn switch detection when the vehicle is not running without concern of battery depletion. Of course, neither the squib monitoring or horn detect functions will interfere with the essential function of airbag firing.

The method and apparatus of the invention works in the following manner. Referring to FIG. 4, the transformer T primary winding 100 is excited with a current pulse 102 from a finite impedance source 104. A voltage pulse produced at the secondary winding 106 then feeds through a capacitor C4 into the squib resistance element 50 resulting in a current flow 108. The resulting current flow 108 recirculates as a resonance between the capacitor C4, the squib 50, and the transformer inductance 106, and dies out over time due to the energy being dissipated in the resistance in the loop. This combination "rings" each time a pulse occurs. A mechanical analogy might be that of striking a bell with an impulse from a hammer, after which the bell rings at its own resonant frequency or tone. It eventually dies out. If the bell's ringing energy is absorbed by some damping action, such as someone holding it, it will still ring at the same frequency, but the ringing will die out in a shorter time.

Figure 5:
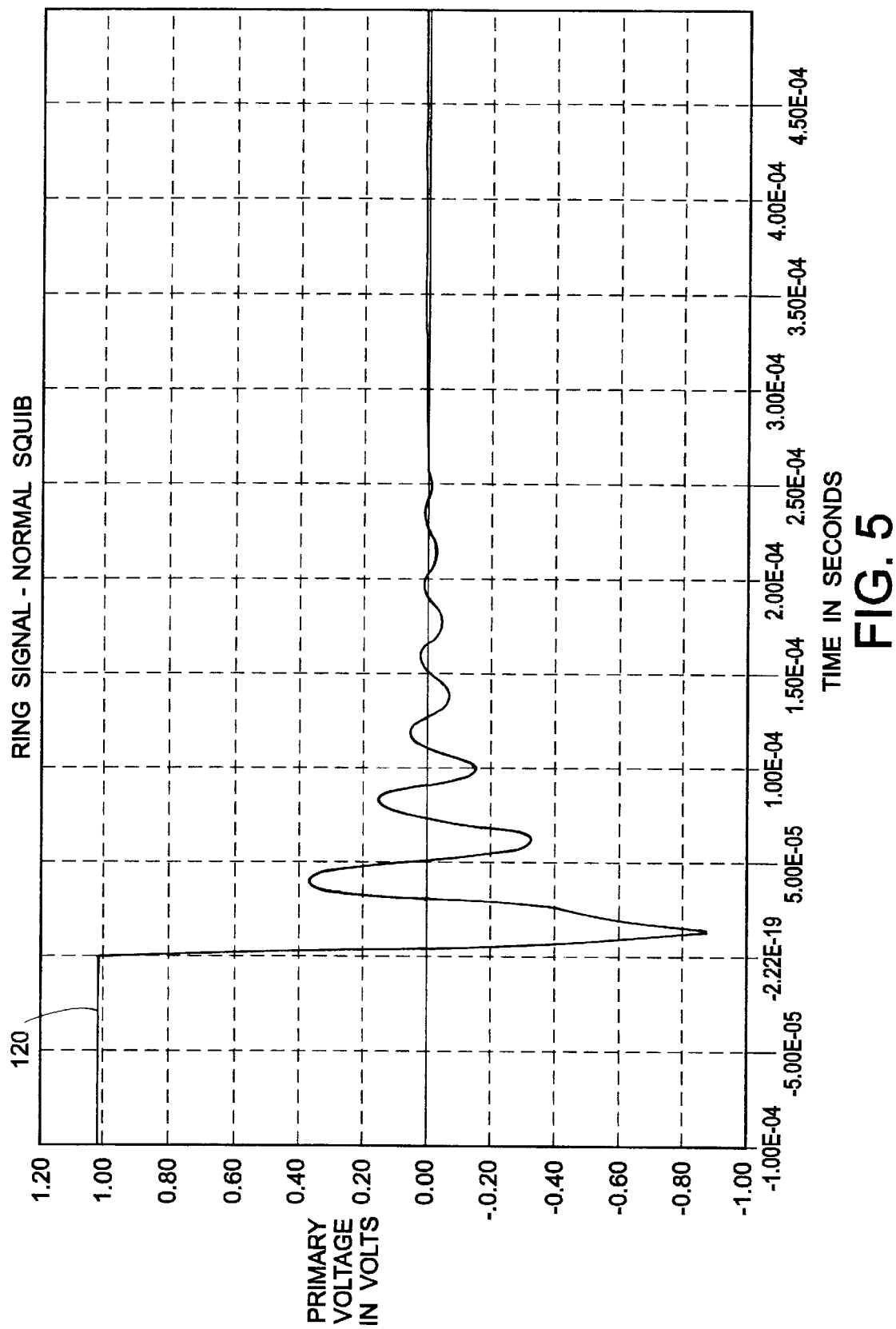
FIG. 5 comprises a diagrammatic illustration of a ring signal generated during normal operating conditions for the system of FIG. 4.
Figure 6:
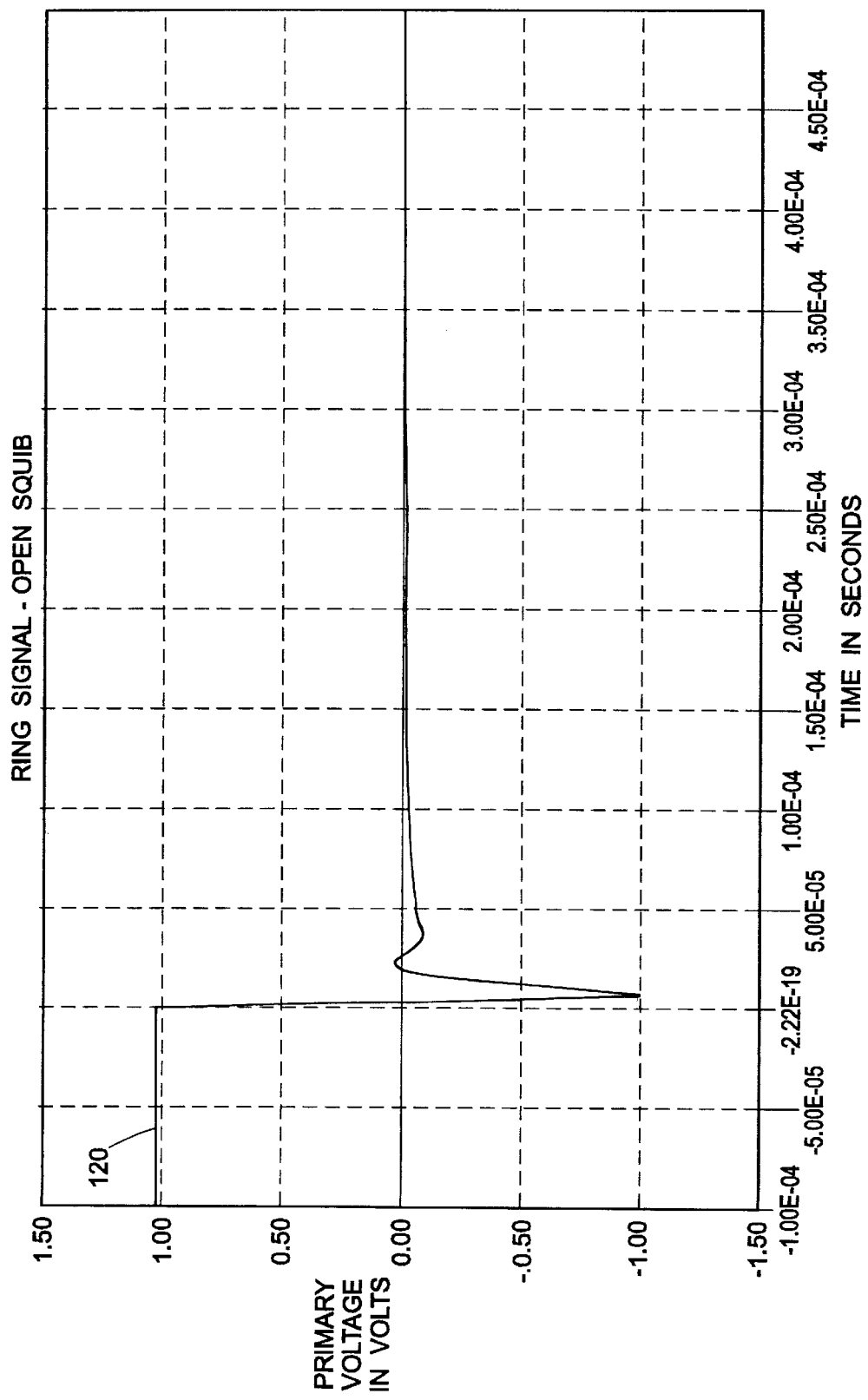
FIG. 6 is a view similar to FIG. 5 wherein the squib element now operates as an open circuit.
Figure 7:
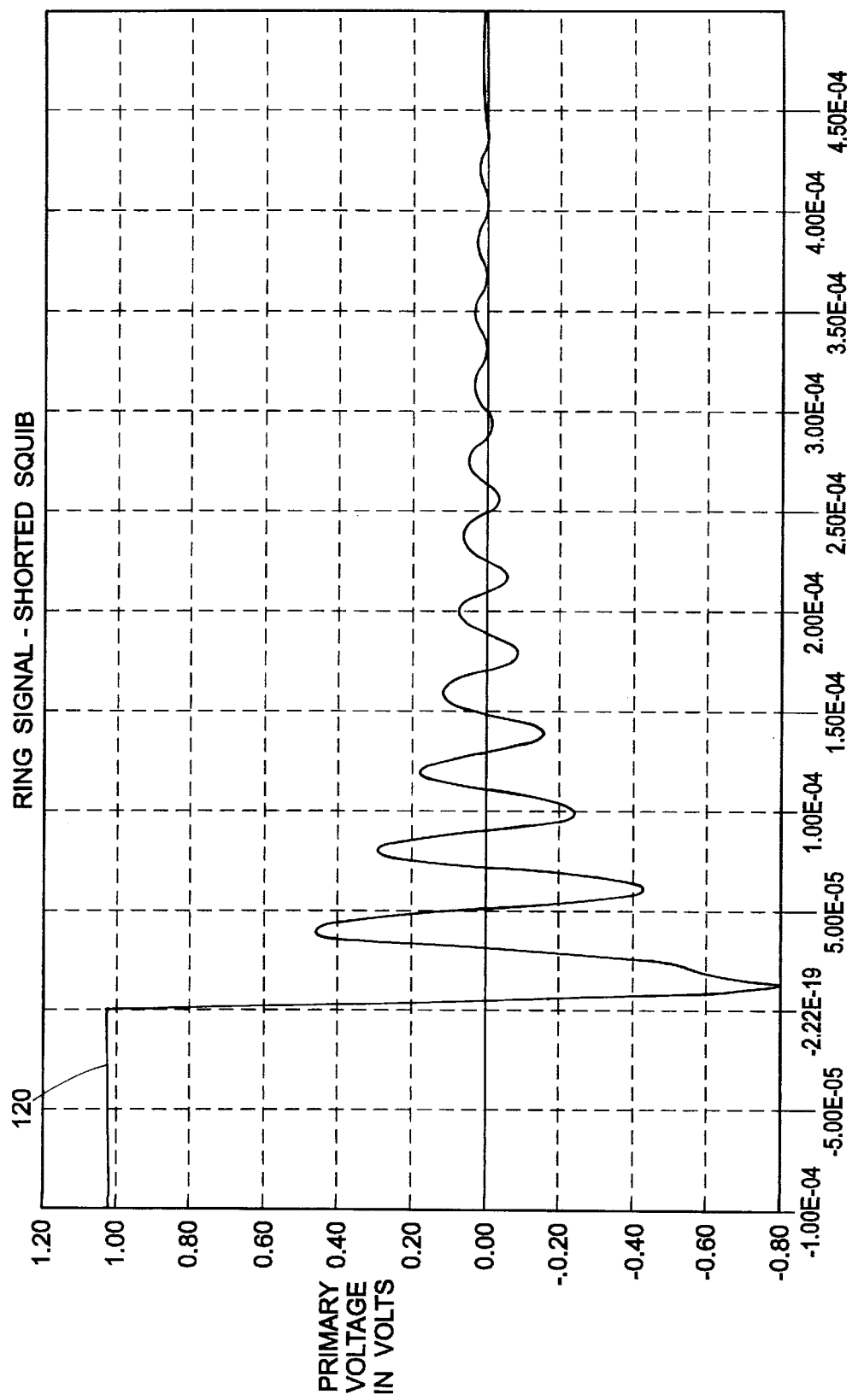
FIG. 7 is a view similar to FIG. 5 wherein the squib element operates as an electrical short.

With this technique, the shape 108 of the ringing envelope, particularly how it is dampened, is a direct function of the resistance (squib) load 50 in the secondary winding loop. As the resonating current 108 goes through the resistance, power is dissipated so the resonance will die out. In effect, the squib resistance 50 affects the "Q" of the ringing circuit, with changes that are quite apparent. By "Q" is meant the quality of the frequency response that is quantitatively defined as the ratio of the resonant frequency to the band width. In terms of energy, Q=2π (maximum energy stored/total energy lost per period). The ringing current 108 on the secondary winding is reflected back to the primary winding where it can be observed as a similar current 110 or voltage signal. The source resistance 112 of the driving circuit on the primary is high enough to minimize its effect on the damping action. FIGS. 5, 6 and 7 show changes in the ringing signal voltage 120 at the primary winding 100 with a secondary normal squib resistance (FIG. 5) an open squib (FIG. 6), and a shorted squib (FIG. 7). As can be seen, as resistance decreases, the ringing signal will be more energetic, i.e., taking a longer time to dampen out, as there are less resistive losses to absorb the energy. In all cases the ringing frequency itself remains approximately the same, or about 25 Khz, but the damping rate changes, and will generally become greater with increasing values of load (squib) resistance. The initial ring amplitude is the same because it is really the initial driving pulse imposed onto the primary when transistor Q1 (FIG. 13A) turns on. The subsequent ringing is really where the load differences manifest themselves. The shape of the damping can be directly correlated with the squib resistance 50, thus with approximate processing, the squib operability and condition can be determined. The processing technique used would depend upon the degree of accuracy and resolution required for monitoring or testing. A simple method involves counting the number of ringing cycle peaks that exceed a minimum amplitude, following each excitation pulse. Improved resolution is achieved through integration of the amplitudes of the successive ringing cycles. Even more sophisticated signal processing can derive the exact damping factor by comparing the percent amplitude decrease of each successive decaying ring. Doing so makes the measurement even less dependent on the exact magnitude of the excitation pulse, transformer air gap size, or other particular circuit features.

The capacitor C4, if left alone in series with the squib 50, would limit the drive signal into the squib when the air bag is to be deployed. This is easily solved with two parallel rectifier diodes, facing opposite directions, connected across the ringing capacitor as will be shown schematically below. If the ringing signal remains below the conduction voltage of the diodes, the signal behaves as if the diodes were not there. In the event that the squib is to be deployed, the actual high amplitude firing burst through the transformer will far exceed that necessary to forward bias the diodes, delivering high current to the squib with minimal loss. Another successful method employs a small "saturable reactor" inductance in place of the diodes. This reactor is designed so that its core is excited only within its linear range by the low amplitude, relatively high frequency of the ringing signal. In this mode, it presents a high reactance, allowing the parallel capacitor to ring with the transformer. If the air bag is to be deployed, however, the high amplitude, lower frequency inverter firing signal quickly saturates the core on the leading edge of each half cycle, dramatically lowering the inductance (to that of the coil with an air core, i.e., essentially only the resistance of the coil winding) thus passing the desired high current to the squib.

Figure 8:
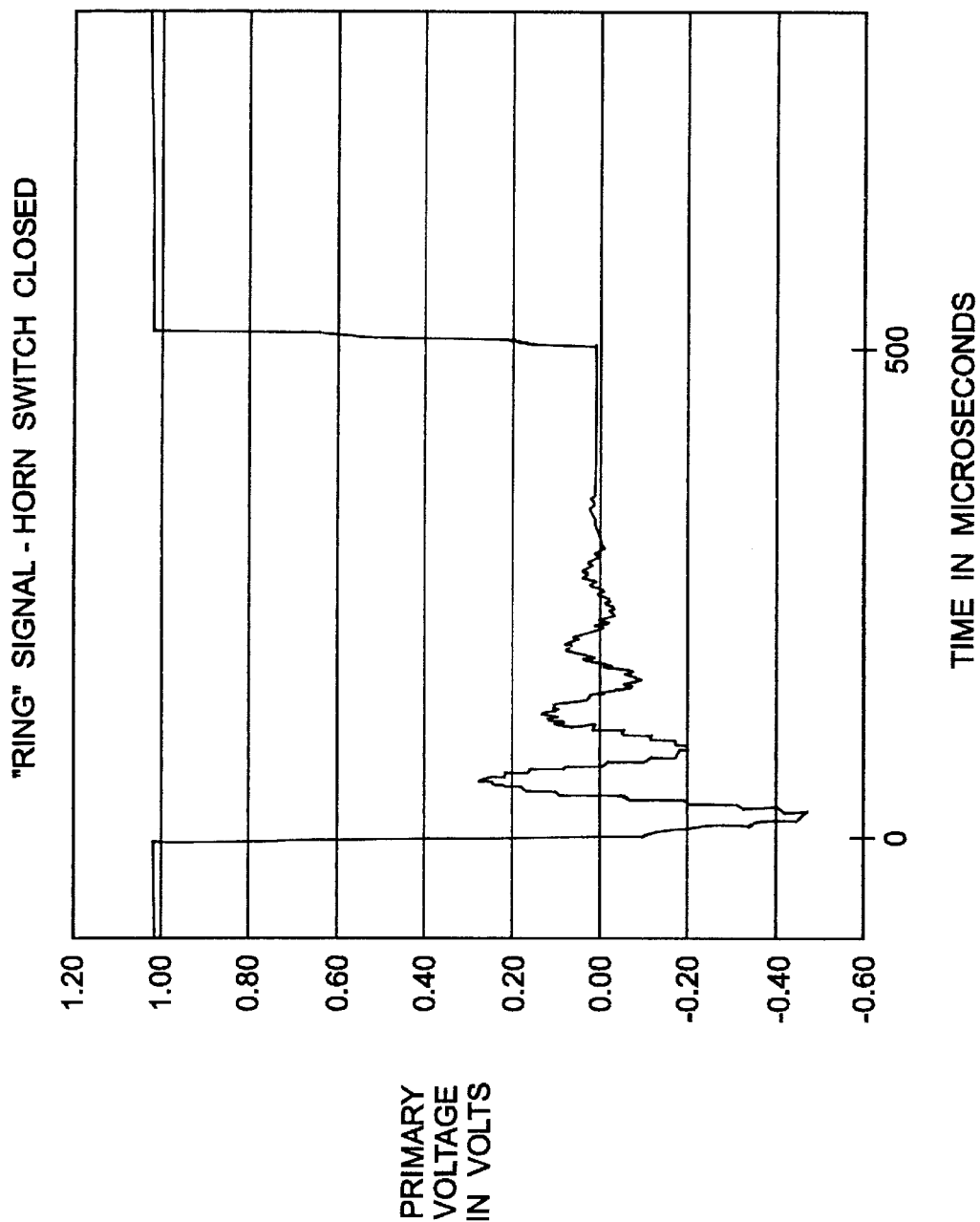
FIG. 8 comprises a diagrammatic illustration of a ring signal when the horn switch is depressed.

In conjunction with the above described squib condition sensing, detecting horn switch 200 closure (FIG. 13A) is possible by using the switch to connect another capacitor C10, across the secondary winding 106 and observing the change in frequency of the ringing signal. FIG. 8 shows the change in the ringing waveform with a 1 mfd capacitor C10 across the secondary winding 106. Comparing this with the normal ringing of FIG. 5, one can see that the ringing or resonance frequency is lowered, in this case from approx 25 Khz down to approx 14 Khz, a significant change which is easy to detect. What is particularly significant is that it is workable whether the squib is at normal resistance, or shorted or open, making the horn function independent of squib condition. Also, if the horn 200 is switched on at a time that the air bag has to be fired, a fairly likely scenario, the capacitor C10 does not appreciably divert deploy current from the squib 50. Any concern that a shortened capacitor might be switched in, shunting current from the squib 50, could easily be alleviated through use of a small, low current fuse in series with the capacitor, which would blow instantly under such conditions. Normal horn operation ringing currents would be far below the fuse blow point. A resistance could also be used in series with the capacitor C10 to limit the loading of a shorted capacitor.

In practice, additional switch functions could be detected merely by switching in various capacitor values, and detecting the ringing frequency changes.

It should also be emphasized that the ringing behavior is the same whether it is invoked rapidly or at a slow rate, just like the bell ringing example. With this approach, a typical ringing burst occurs within a very short interval of, for example, only 500 microseconds, from which all the desired conditions can be observed. The system test updating rate requirements might only be once every several seconds, although a practical rate for horn button detection would be more like 5 to 10 times per second. Whatever the requirements, this technique can operate at rates limited only by the ring out test duration, or close to 2000 times per second. At slow rates the power consumption can be very low, permitting functions such as horn detection to be operational even with the vehicle shut down.

Figure 9:
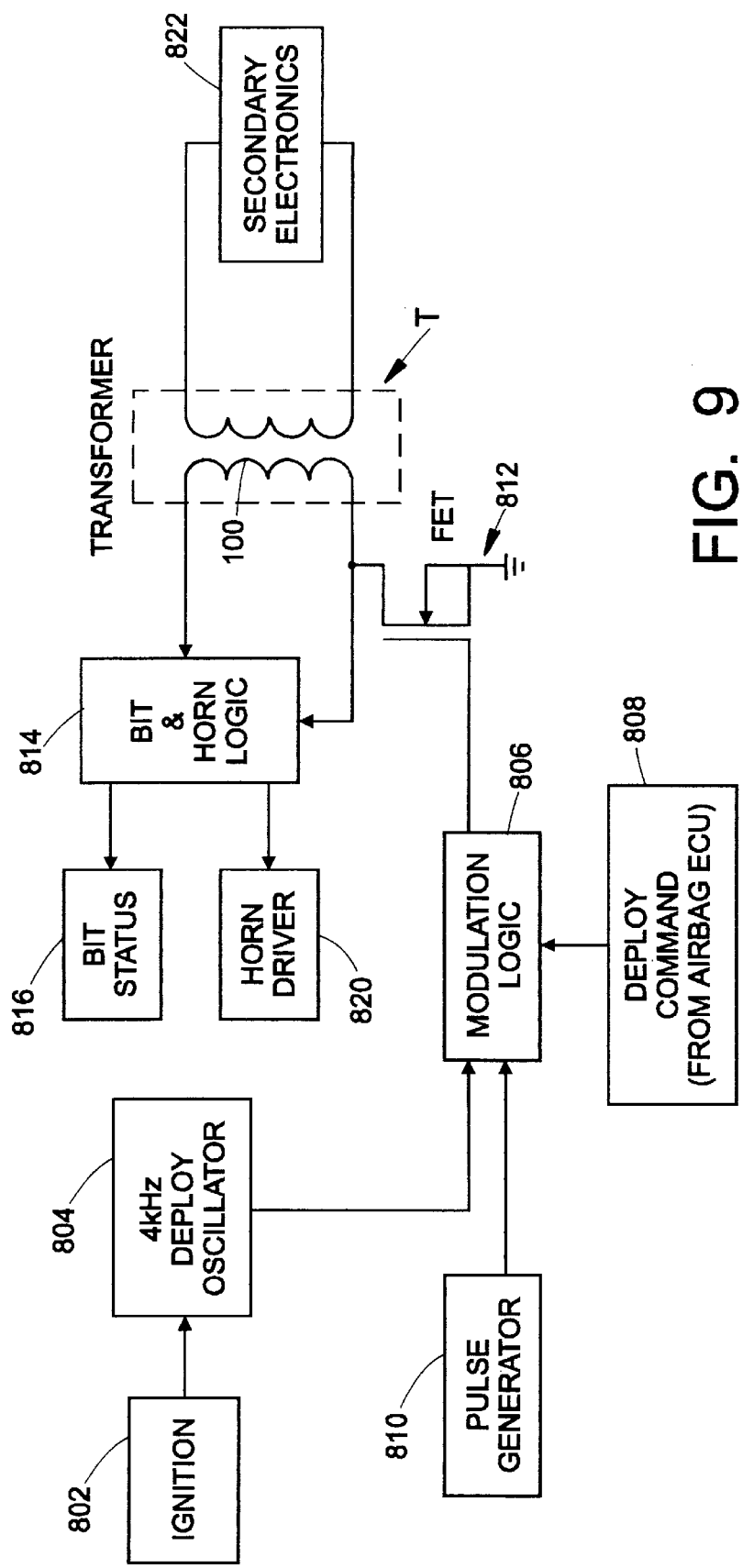
FIG. 9 comprises a block diagram of an excitation signal extraction circuit formed in accordance with the principles of FIG. 4.

With reference to FIG. 9, a block diagram is shown which is representative of a column side circuit system for accomplishing primary excitation and signal extraction in accordance with the ringing method of FIG. 4. Although there are a plurality of processor techniques which can be implemented in the block diagram, some of which will be discussed below, all can be explained with reference to FIG. 9.

The ignition block 802 provides the appropriate signal to turn on the deploy oscillator, indication of ignition on and normal operation. The deploy oscillator 804 is the main (squib) square wave oscillator for deployment modulation. The modulation logic block 806 modulates the primary winding 100 of the transformer T at a normal frequency of 5 hz and will switch to a 4 khz signal when a deployment comment is received from the airbag electronic control unit 808. The pulse generator 810 provides a 500 msec on time and a 200 mmsec off time pulse used to "ring" the primary winding 100. This ring signal is processed in accordance with the subject invention to monitor squib condition and horn switch activity. The FET 812 is the active element in the circuit responsible for primary modulation. The BIT and horn logic block 814 will operate in accordance with the various methods described in detail below. The "BIT" (Built-in Test) of status block 816 is responsible for displaying squib status. The horn driver block 820 will sound the horn when the horn switch is depressed on the wheel side and is detected through the logic block 814. It is a feature of the subject invention that the secondary electronics 822 are all passive components for circuit minimalization of wheel side electronics.

Method 1: Comparator Threshold Processing

There are two ways to accomplish this processing technique. One way is to count pulses and determine secondary activity based on specific number of counts. Anther method is to integrate the pulses and obtain a final voltage based on the total number of pulses reflected.

Counts

Figure 10:
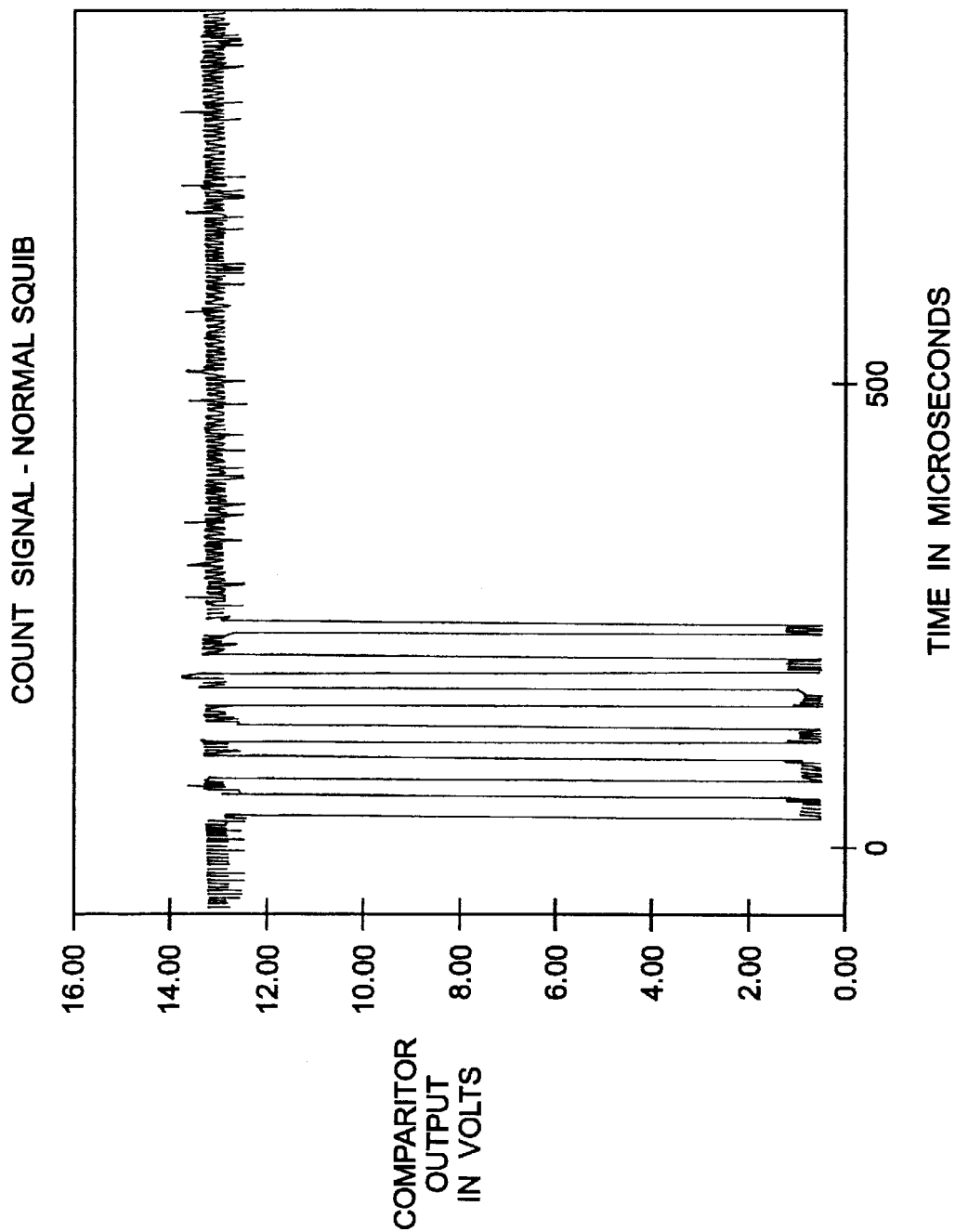
FIG. 10 is an output signal for monitoring the ring signal by a counting processing technique.

If you take the negative peaks (positive peaks could also be used), as shown in FIG. 5, and input those into a window comparator, you would get a square wave as shown in FIG. 10.

Each peak of the square wave would be counted as 1, and the total "count" compared to the preset values for squib condition and horn switch activity. For example, FIG. 10 is the "count" for a normal squib with horn switch open, so a count of 6 would equal this condition. There are different counts for each condition which is based on the detected ring signals.

In FIG. 6, the count would be 1, indicating an open squib, horn switch open. In FIG. 7, the count would be 10, indicating a shorted squib, horn switch open.

Pulse Integration

Figure 11:
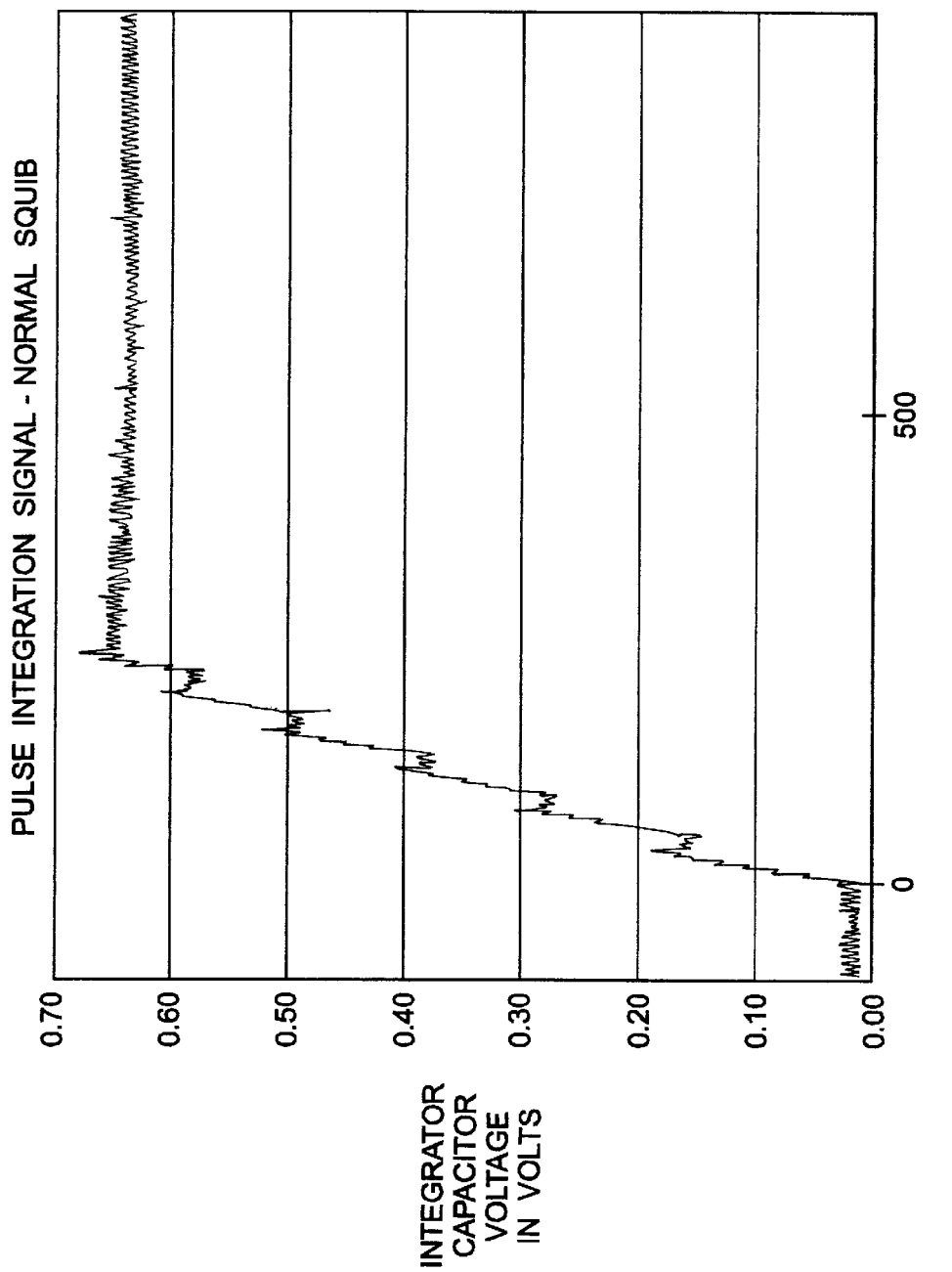
FIG. 11 is a diagrammatic output of a processing technique wherein the ring signal is integrated.

This technique starts with the same circuit as the count method. That is, the ring signal is an input to a comparator which produces the same square wave as mentioned above. However, this square wave is now put into an RC network which acts as integrator. The final voltage on the capacitor is a function of the number of counts or peaks of the comparator output. FIG. 11 is an example of an integrated signal which is a normal squib with horn switch open. Because the pulse widths become narrower at the decaying end of the burst, this "PWM" (Pulse Width Modulation) action results in an integration with finer resolution than discrete counting (mentioned above) can provide.

Method 2: Integration of Peaks

Figure 12:
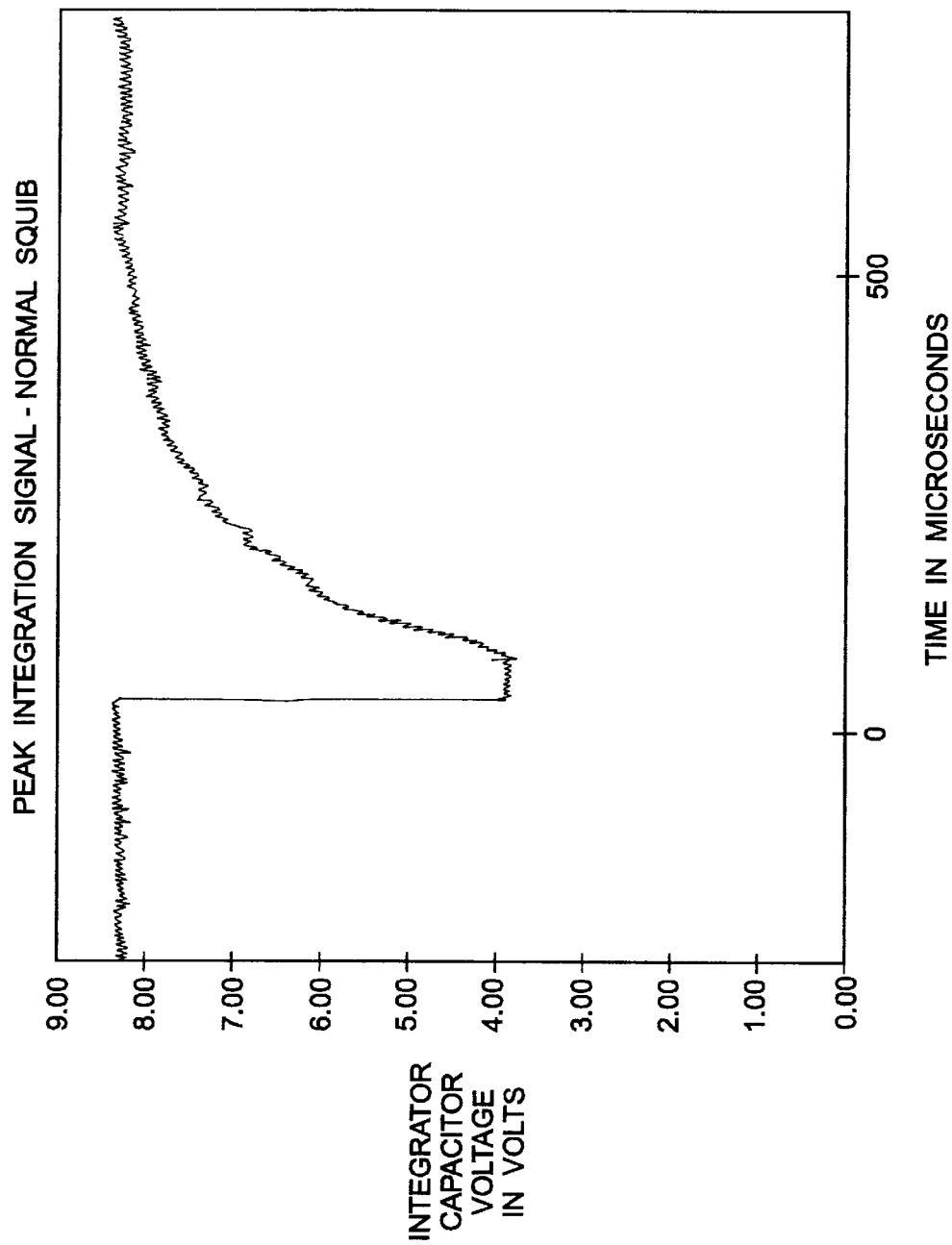
FIG. 12 is a diagrammatic signal representative of an output of another processing technique wherein the ring signal is output to a sample and hold circuit and then integrated.

This method is completely different from the pulse integration mentioned above. In this method, the ring signal is input to a sample and hold circuit. The output from the sample and hold circuit is then integrated by an RC network. This approach basically integrates or represents the energy under the curve for the ring signals. The advantage to this is even finer resolution of secondary impedance as compared to pulse integration. With reference to FIG. 12, it can be seen that there are no steps in the integration waveform as seen before in FIG. 11. Here, a change in secondary impedance changes the slope of the integration rather than the number of steps. Greater accuracy is achieved by the approach, because both the positive and negative peaks (from the ring signal) are used.

Method 3: Analog/Digital Signal into Microprocessor

This is obviously the most elegant solution, which requires a microprocessor on the column side. However, since the airbag ECU has a processor already, this technique should be considered if there is sufficient computing power leftover in the airbag processor. This technique involves passing the ring signal directly to an analog to digital (A/D) converter, and treating the results entirely in a digital manner (as opposed to the combination of analog and digital circuits in the previous methods). This method has the highest level of accuracy and system diagnostic capabilities.

In terms of comparison, each method has advantages and disadvantages. The Comparator Threshold method, while requiring the least amount of circuitry, provides the lowest resolution. Improved resolution is provided by the Peak Integration method, however more complex circuitry is required. The Analog/Digital Signal into a Microprocessor method provides the highest resolution and can also detect transformer gap variation. This method, however requires the most complex circuitry and requires additional circuit integration into the airbag ECU.

Horn Detection

The same "ring" phenomenon discussed for squib condition is also used to detect the status of the horn switch. Normally, the system is monitoring the squib resistance and can detect the change in ring waveform when the horn switch is depressed. The frequency or rate of the ringing is changed by the horn switch connecting to a capacitor across the secondary. This change is easily detected at the primary and a sample of the ring signal was shown in FIG. 8. It should be noted that the squib condition cannot be "seen" while the horn switch is depressed. The solution to this is to latch the last squib value when the horn switch is detected and return to normal BIT once the horn switch is released. Airbag deployment is not affected by the horn switch status.

Operational Circuit Example

The following description is for only one of a number of ways to actually schematically process the ringing signal observed at the primary of the rotary transformer. As noted above, the main consideration of this disclosure is the basic concept of pulsing the transformer primary winding 100 and observing and processing the resultant ringing waveform to derive information about secondary conditions. Simple processing circuitry can derive sufficient information for many requirements, but the principal, and resulting signature lends itself to high accuracy and resolution if appropriate processing is performed.

Figure 13A:
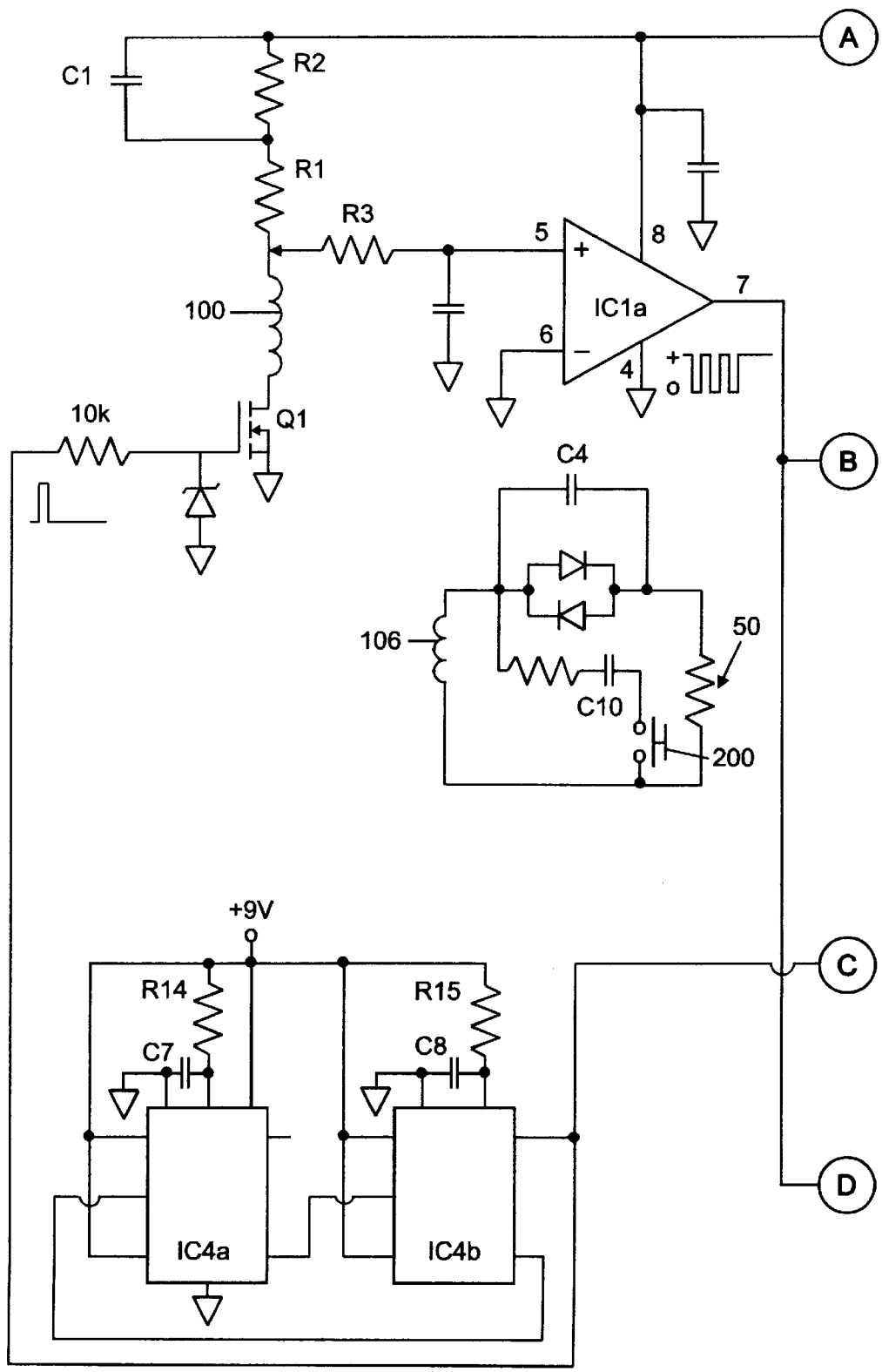
FIGS. 13A–C is a detailed schematic of an airbag firing circuit formed in accordance with the alternative embodiment of the present invention.
Figure 13B:
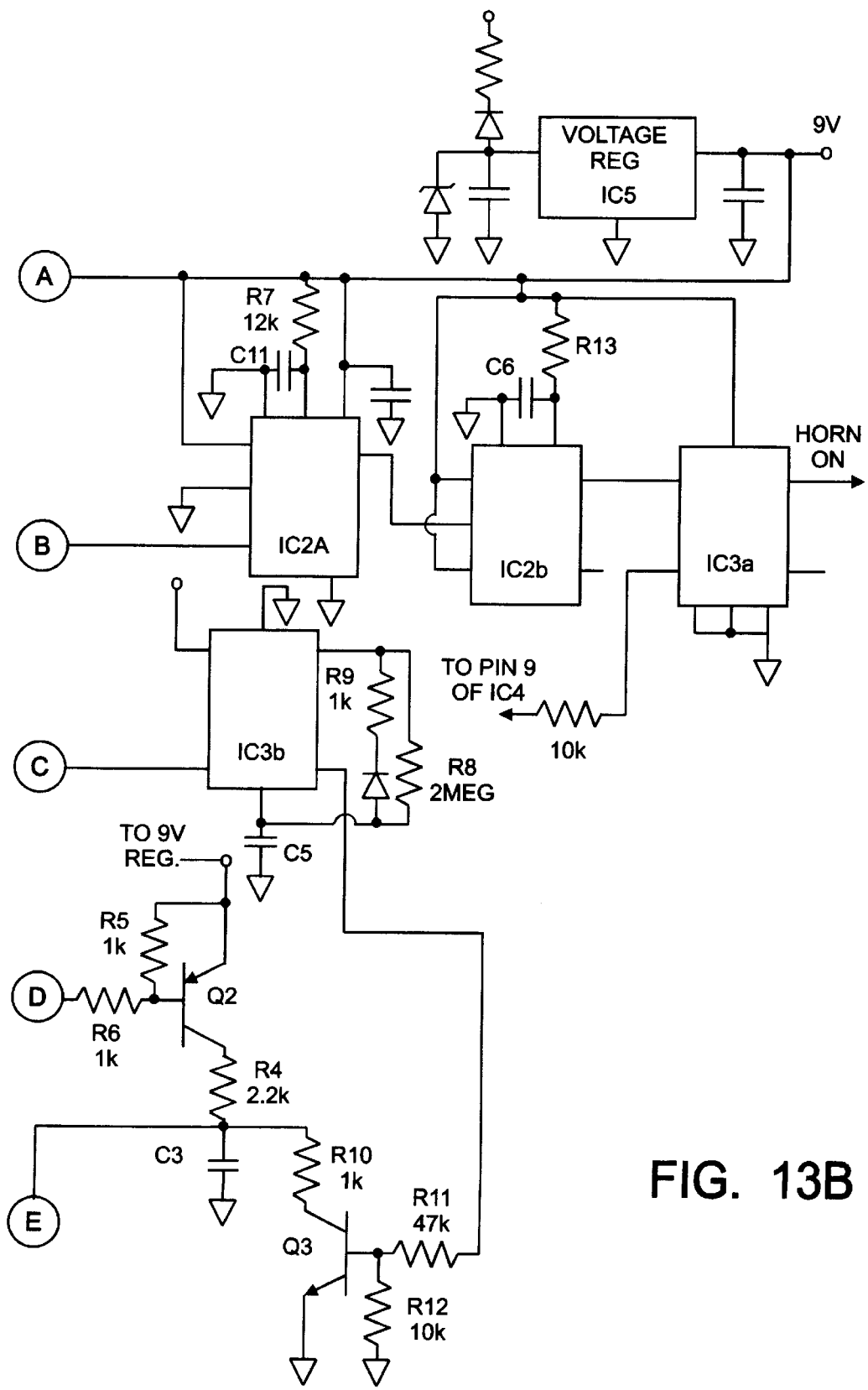
Figure 13C:
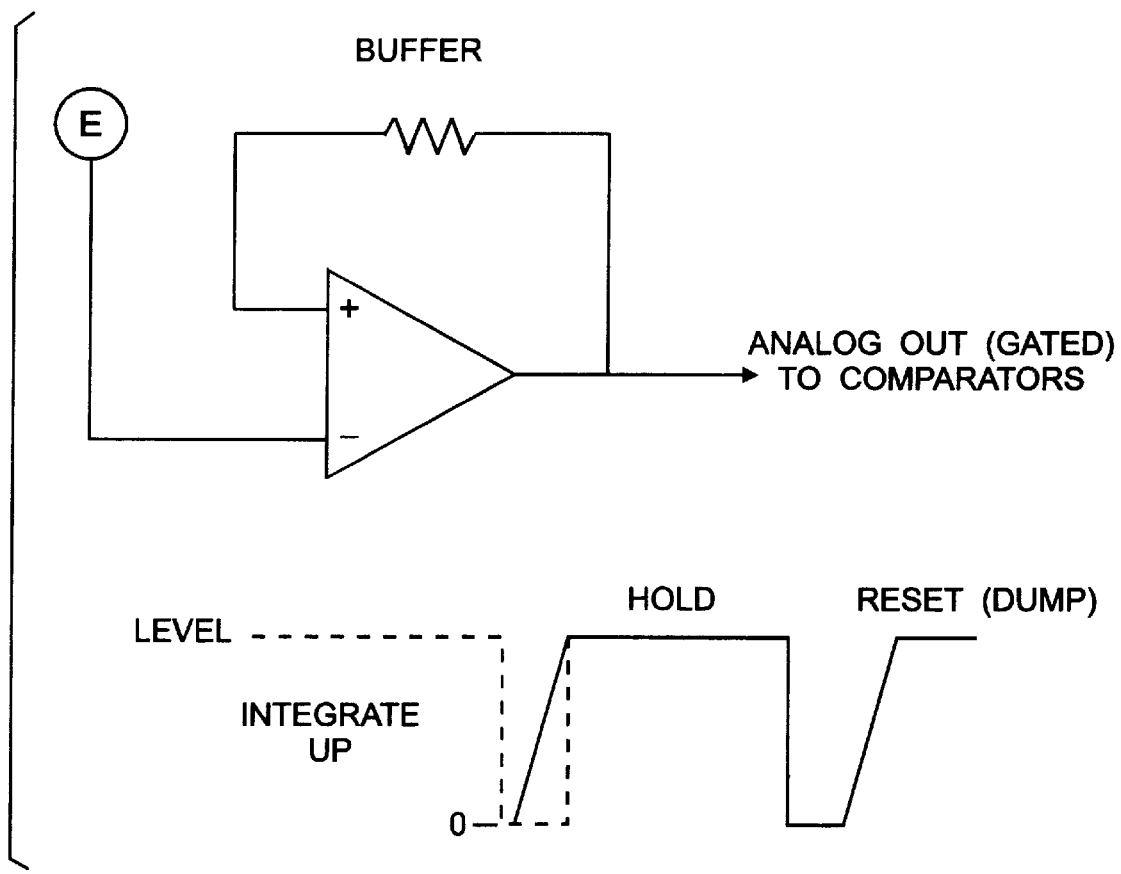

FIGS. 13A–C are a schematic diagram of one type of circuit which employs the principles described previously, including squib deploy, squib test, horn detection, and low average current consumption. On the secondary side 106 of the transformer are shown the squib resistor 50, the two parallel/reversed diodes, the ringing capacitor C4, and the horn switch 200 and associated capacitor C10, all of course which would be located within the steering wheel assembly. All remaining circuitry is located on the vehicle end of the steering column, with the rotary transformer T as the coupling element.

Immediately connected to the lower side of the primary winding 100 is the drain terminal of a power FET transistor Q1, which in this implementation is the main power inverter driver for the squib firing function. With the high side of the transformer tied to a 12 to 16 vdc, high current power source, and the gate of the transistor driven by a 4 Khz square wave, substantial energy would be transferred to the secondary winding, which, as described previously, would easily forward bias the rectifier diodes and apply firing power to the squib element 50. Not obvious in FIG. 13A, during airbag deploy the 12–16 vdc high current supply is switched directly to the high side of the transformer just when Q1 is driven in the high power inverter mode at 1 to 4 Khz. A logic section is also required to steer the gate input of Q1 from normal test mode signals over to the 4 Khz square wave signal source.

During normal operation only the squib condition testing and horn switch detection functions are enabled. These are as follows:

Connected in series with the high side of the transformer are two resistors, R1 at 22 ohms, and R2 at 470 ohms. The 470 ohm resistor has a capacitor C1, of 0.15 mfd across it. The high side of this combination is connected to a regulated power source. Now, if the gate of Q1 is turned on from an off condition, the drain terminal will quickly toggle toward ground level. Initially, capacitor C1 is at a zero charge level, effectively initially bypassing the 470 ohm resistance, generating a current step with a leading edge magnitude limited mostly by the 22 ohm resistance of R1 partially by the inductance it is driving, and which flows through the primary winding. The time constant of the 22 ohm resistor and the 0.15 mfd capacitor is such that the capacitor charges rapidly and the current quickly decays to a lower level, determined by the higher, 470 ohm R2 resistor. In effect, a brief current spike of controlled shape is imposed onto the primary winding, generating a voltage spike on the secondary winding. The initial pulse is now generated, which excites the transformer and related circuitry into a ringing mode. As described earlier, the capacitor C4 resonates with the transformer inductance. The resonance dampens out due to resistance (mainly the squib) in the loop, producing a ringing burst decaying to zero. The decay shape or "damping factor" is a function of the load resistance. The impedance of the primary driving source is high enough to minimize its effect on damping. The same characteristic ring is generated each time Q1 is turned on.

During the ringing burst, Q1 holds the lower end of the primary winding at ground level. Thus the ringing voltage generated can be conveniently observed at the top of the winding with respect to ground. This circuit takes advantage of this by feeding the signal at this point into a voltage comparator, IC1a (LM393), and toggling the comparator with the ringing as it swings positive and negative with respect to ground. The inverting input at pin 6 is connected to ground, and the transformer signal fed to the non-inverting input through a small filter, R3 and C2. Whenever Q1 is off, which is most of the time, the non-inverting input of the comparator is solidly held high through R2 and R1 up to the positive supply voltage, thus the comparator at pin 7 is high, or at a logical "1" state. When Q1 is briefly pulsed on (approximately 500 microseconds) to induce ringing, the ringing cycles that swing negative with respect to ground then pull the non-inverting input below the ground level on the inverting input and the comparator output toggles low for that interval. A small dc offset voltage exists on the transformer winding as a result of the current though the "on" resistance of the FET. This provides a specific "window" at the comparator input for the ringing to oscillate around. Toward the diminishing end of the ringing, the negative swings can no longer exceed this and the comparator output is no longer toggled. Thus, the ringing action produces a burst of pulses at the comparator output each time Q1 is gated on. As discussed above, one simple technique for processing these bursts for identifying squib condition is to merely count the number of comparator output pulses each time the transformer is rung. The circuit described here, however, instead integrates the burst to produce a dc voltage signal. Here the output of the comparator is fed to the base of a PNP transistor Q2 (FIG. 13B), which switches on during each negative pulse. With reference to FIG. 13B, the emitter of Q2 is tied to the regulated voltage supply. The collector of Q2 now pulses regulated voltage into an integrated network, R4-C3. The integrating capacitor, C3, accumulates a charge based on the number of and width of the pulses from Q2, such that the voltage across it at the end of the sampling period is representative of the energy in the ringing burst. This method provides better resolution than pure pulse counting because it is further influenced by a certain amount of pulse width modulation of the comparator output signal caused by the diminishing amplitude of the decaying waveform. The integrated voltage produced on C3 from each ringing burst is retained as a DC voltage which is a function of the load resistance (squib) on the secondary. It is held in a sample and hold manner (for other processing) until just prior to the acquisition of the next burst where it is dumped to near zero level in preparation for the next integration cycle. Transistor Q3 is used to dump the charge on C3. The base of Q3 is driven by the output of monostable timer IC3b in the following manner. This timer is initiated each time the ringing pulse is triggered by the main timing generator IC4a&b (As seen in FIG. 13B). The time period is selected to be slightly shorter than the main timer such that C3 will always be dumped just prior to a new integration period. For instance, if the main cycling operates on a 200 millisecond cycle (5 times per sec), then this timer is set for, say, 180 milliseconds. The first brief 500 microseconds (or ½ millisecond) of this time would be the acquisition or integration time, then C3 would remain charged for approx 180 milliseconds, during which it could be fed to voltage comparators, A/D inputs, etc. for processing, then the approximate remaining 20 milliseconds would be the time Q3 is turned on to dump C3. If the main timing cycle were to be sped up, then this time would have to be shortened accordingly. This method is only one of numerous ways to sample and hold the capacitor voltage signal, therefore the concept is what is important here, not the specific technique. It should also be mentioned that whatever technique is used for processing, the first ring pulse could be blanked out of the measurement since, as described earlier, this is always the same since it is from the impulse from the driving circuitry, and only the subsequent ringing is significantly affected by the reflected load.

When the horn switch on the steering wheel is closed, it connects an additional capacitor into the secondary circuit that lowers the ringing frequency. This change is easy to detect with a variety of methods. The particular circuitry shown in FIG. 13B uses a monostable timer IC2a, configured in a retriggerable mode. If a negative pulse is applied to pin 5, the output at pin 6 toggles high and remains so until it times out after which pin 6 goes back low. Once triggered, but prior to time out, if another trigger pulse is fed to pin 5, the monostable timing period will restart, with pin 6 output staying high. Consequently, if successively retriggered at a rate frequent enough prevent timeout, the output would remain high. There would be a precise rate above which the output would stay high and below which the output would exhibit toggling. This frequency would be determined by the reciprocal of the monostable time period as determined by resistor R7 and capacitor C11. This effect is used as a sort of frequency or rate counter for the ringing pulses from the output of the comparator. Normal ringing rates of approx 25 Khz would keep the output of IC2a, pin 6, high during the 500 microsecond ringing period, in effect producing a single stretched pulse. In the event that the horn is depressed, the ringing frequency would be lowered below the critical rate and the output at pin 6 would produce several pulses, one for each ring pulse.

Now, although the existence of a single pulse versus a string of pulses at the output of IC2a provides an effective frequency discriminator, this only occurs for approx 500 microseconds out of every 200 milliseconds and must be further processed to provide a discrete logic signal annunciating the horn condition. Again, numerous methods exist to accomplish this. One way, shown here, uses another resettable monostable time IC2b, which is triggered by the output of the frequency detecting monostable IC2a, described above. Remembering that when IC2a is detecting normal ringing (no horn), its output at pin 6 generates only a single pulse during each 500 microsecond ring interval, thus meaning that IC2b is only triggered once, by the first positive slope of the IC2a output. Now, if the IC2b timer interval is set to a period slightly shorter than the main 500 microsecond period, its output at pin 10, which was toggled high at the start of the 500 microsecond interval, will go back low slightly before the 500 microseconds expires. This signal is fed to the "D" input, pin 5 of a CMOS 4013 "D: type flip-flop, IC3a. The complement of the 500 microsecond pulse is fed to the clock input, pin 3, of this flip-flop. The "Q" output, pin 1, of the "D" flip-flop, as configured, will latch at the same state existing on the "D" input when the clock input is toggled high. Therefore, on each cycle, the "D" input will be at zero state when the clock input goes high, generating a zero state on the flip-flop output. The overall result is that the flip-flop output at pin 1 will remain continuously low as long as the ringing occurs at its normal frequency.

If the horn is enabled, the lower ringing frequency will cause the output of the frequency discriminating stage IC2a, to toggle more than once. In doing so, each positive transition retriggers the input of IC2b, restarting its monostable timing interval each time. Thus the output at pin 10 now remains high at the end of the main 500 microsecond period. With the "D" input of IC3a now at a high state when the clock input at pin 3 toggles high, the output at pin 1 latches high. The result is that the output at pin 1 remains steadily high while the horn switch is closed and can be used as a command signal for the horn system.

The main timing pulses are generated here with two monostable timers, IC4a and IC4b from FIG. 13A. IC4b provides the 500 microsecond test period during which the ringing is initiated and subsequently processed. IC4a establishes the off duration between test pulses, or essentially the rate of testing, i.e., when at 200 milliseconds the rate would be 5 tests per second. Resistor R14 and capacitor C7 determine the time for IC4a and R15 and C8 and IC4b timing. The two timers alternately trigger each other on and off to form a free running timing generator alternating between 500 microseconds and 200 milliseconds, the outputs of each being used as signal sources for the various processing circuits previously discussed.

Referring back to FIG. 13B, the power supply regulator IC5 is a type that draws low quiescent current to help minimize battery loading. It should be noted that all of the test waveforms shown in all of the above figures were with a 12 vdc source, but behavior with 9 vdc would be essentially the same. The actual power consumed by the entire circuit is very low, particularly because low power, very brief test pulses are used, and need only occur at a slow rate of 5 to 10 times a second, mainly determined by how frequently the horn switch state is to be sampled. The logic blocks are CMOS type IC's with very low quiescent current and slow clock speeds. This permits operation with the vehicle shut down, but where horn switch detection is still required.

Figure 14:
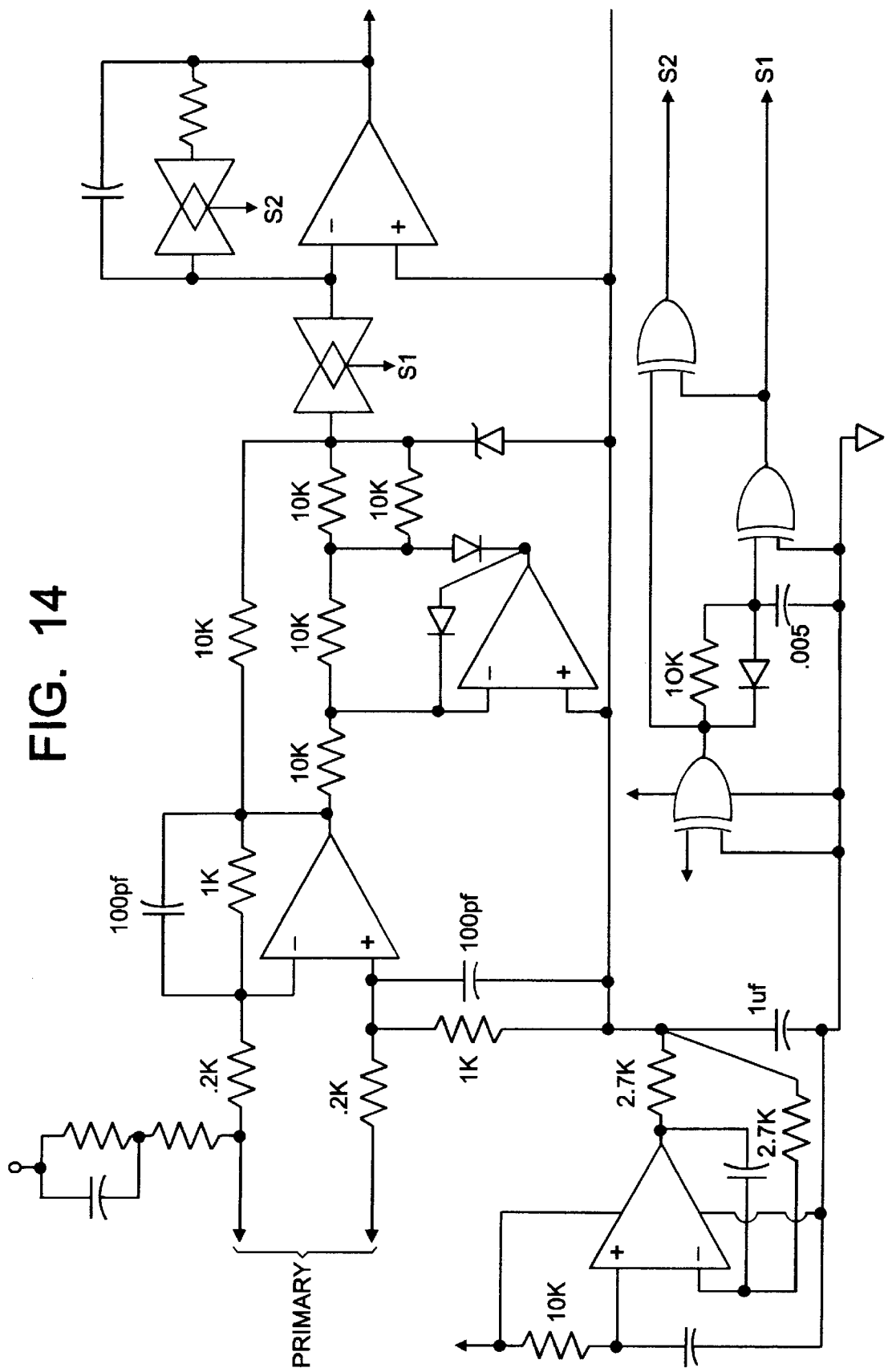
FIG. 14 is a detailed schematic of another type of processing circuit for a portion of the circuit of FIG. 13 comprising a sample and hold integrator system.

Another type of processing circuit is shown in FIG. 14. This could be used in place of the sample and hold integrator system described earlier. It is based on linearly processing the ringing signal, precision rectifying it, and integrating or adding the individual peak amplitudes of each of the rings as a summed voltage across a sample and hold capacitor. Elaborating, the ringing signal across the floating transformer primary winding is amplified and converted to a single ended signal (with respect to ground) by the Differential Amp. stage. The signal is then rectified by a Precision Full Wave Rectifier stage whereby both the positive and negative ringing waveforms swing in the same polarity direction. Now both positive and negative rings are processed, doubling resolution. The peaks of these are now steered through an integrated circuit "analog switch" to a Sample and Hold stage that pumps up its capacitor voltage in steps, each step being equal to the peak magnitude of each successive ring throughout a ring burst. With the decaying burst, each voltage step will be slightly smaller, but will still add to the total voltage. The final voltage thus is representative of the sum of the peaks of the ring, thus providing an accurate representation of the shape of the ring. This sum can then be fed to appropriate comparators or A/D signal inputs for subsequent processing. This circuit also provides a control logic stage that interfaces with the main timing and pulse generator signals described for the earlier system. Also, the logic provides timing to exclude the first "fixed amplitude" ring from the integration process, improving resolution somewhat.

Yet another method of processing would be with a microprocessor system, sampling the decaying ringing signal at several points, through an A/D converter. Appropriate software would permit deriving accurate measurement of the damping characteristic and thus the resistance of the squib load on the secondary. This method could compensate for large changes in transformer gap, and indeed could permit determining the actual gap size by comparing the amplitude of the driving pulse to that of the first ring. A microprocessor system could also generate all necessary timing, pulses, logic, etc. Also, detection of ringing frequency changes from the horn function, and other switches, would be easily accomplished.

The invention has been described with reference to the preferred embodiments. Obviously modifications and alterations will occur to others upon a reading an understanding of the specification. It is our intention to include all such modifications and alterations insofar as they come within the scope of the appended claims or the equivalents thereof.

Having thus described our invention, we now claim:

1. A control circuit for transferring an air bag firing signal through a vehicle steering column comprising:
    an electrical link having a primary and secondary structure, wherein the primary structure is associated with a column side of the steering column and the secondary structure is associated with a wheel side of the steering column, wherein the secondary structure comprises an air bag and passive circuit elements,
    a high power level circuit for generating a power signal suitable for firing the air bag and for transferring said power signal from the column side to the wheel side, and
    an excitation and monitoring circuit for generating a test signal for testing operability of the secondary structure and for transferring the test signal from the column side to the wheel side through the electrical link, and for monitoring on said column side a response signal generated on said wheel side representative of the operability of the secondary structure and transferred back through the electrical link whereby the operability is determined by the comparison of the response signal with predetermined signal conditions.

2. The circuit as defined in claim 1 wherein said secondary structure includes a resonant circuit comprising a squib element of the air bag and said response signal comprises the quality of the frequency response of the secondary structure.

3. The circuit as defined in claim 1 wherein said passive circuit elements include a horn signal switch which changes said response signal for indicating horn sounding on the primary structure in response to user activation.

4. An airbag deployment and monitoring circuit for transferring an air bag firing signal through a vehicle steering column comprising:
    a rotary transformer having a primary and secondary magnetic structure, wherein the primary magnetic structure is associated with a column side of the steering column and the secondary magnetic structure is associated with a wheel side of the steering column and includes a squib element for an air bag,
    a pulse generator on the column side for generating a test pulse,
    an RC circuit on the wheel side for generating a ring signal representative of air bag firing operability wherein the squib element comprises a resistive element of the RC circuit, and
    a monitoring circuit on the column side for detecting the ring signal and for determining airbag operability by comparison of said ring signal with predetermined standards.

5. The circuit as claimed in claim 4 wherein said monitoring circuit detects ring signal dampening.

6. The circuit as claimed in claim 4 further including a horn switch on the wheel side, wherein user switching of the horn switch changes said ring signal in a manner to be detectable by said monitoring circuit for sounding of the horn.

7. The circuit as claimed in claim 6 wherein said monitoring circuit includes means for detecting a frequency shift in said ring signal.

8. The circuit as claimed in claim 4 wherein said monitoring circuit comprises a circuit for comparator threshold processing of said ring signal.

9. The circuit as claimed in claim 8 wherein said circuit for comparator threshold processing comprises a comparator for counting peaks of the ring signal.

10. The circuit as claimed in claim 8 wherein said circuit for comparator threshold processing comprises a comparator for pulse integration.

11. The circuit as claimed in claim 4 wherein said monitoring circuit comprises a sample and hold circuit with an integrated output.

12. The circuit as claimed in claim 4 wherein said monitoring circuit comprises an analog to digital converter for the ring signal.

* * * * *